(12) United States Patent
Wieczorek et al.

(10) Patent No.: US 11,959,313 B2
(45) Date of Patent: Apr. 16, 2024

(54) VEHICLE STORAGE COMPARTMENT LATCH ASSEMBLIES WITH SHAPE MEMORY ALLOY ACTUATOR

(71) Applicant: MOTHERSON INNOVATIONS COMPANY LIMITED, London (GB)

(72) Inventors: Romeo Wieczorek, Stuttgart (DE); David-Kenneth Jaeger, Stuttgart (DE); Jean-Francois Bourdon, Harnes (FR); Ludovic Carpentier, Harnes (FR)

(73) Assignee: Motherson Innovations Company Limited, London (GB)

( * ) Notice: Subject to any disclaimer, the term of this patent is extended or adjusted under 35 U.S.C. 154(b) by 79 days.

(21) Appl. No.: 17/297,191

(22) PCT Filed: Dec. 2, 2019

(86) PCT No.: PCT/EP2019/083273
§ 371 (c)(1),
(2) Date: May 26, 2021

(87) PCT Pub. No.: WO2020/109622
PCT Pub. Date: Jun. 4, 2020

(65) Prior Publication Data
US 2022/0003024 A1 Jan. 6, 2022

Related U.S. Application Data

(60) Provisional application No. 62/870,042, filed on Jul. 2, 2019.

(30) Foreign Application Priority Data

Nov. 30, 2018 (FR) .................................. 1872147
Dec. 24, 2018 (FR) .................................. 1874089

(51) Int. Cl.
*E05B 51/00* (2006.01)
*E05B 47/00* (2006.01)
(Continued)

(52) U.S. Cl.
CPC .......... *E05B 81/04* (2013.01); *E05B 47/0009* (2013.01); *E05B 77/44* (2013.01);
(Continued)

(58) Field of Classification Search
CPC ...... E05B 83/28; E05B 83/30; E05B 47/0009; E05B 51/005; Y10T 292/696;
(Continued)

(56) References Cited

U.S. PATENT DOCUMENTS 4,609,215 A * 9/1986 Self ........................ E05B 51/02
292/144
4,753,465 A * 6/1988 Dalby .................... B64G 1/645
292/156
(Continued)

FOREIGN PATENT DOCUMENTS

DE 4327381 A1 * 2/1995 ......... E05B 47/0009
DE 10036945 A1 * 2/2002 ............. E05B 77/42
(Continued)

OTHER PUBLICATIONS

International Search Report dated May 29, 2020 of International application No. PCT/EP2019/083273.
(Continued)

*Primary Examiner* — Carlos Lugo
(74) *Attorney, Agent, or Firm* — Jones Day

(57) ABSTRACT

A latch assembly for an access door of a storage compartment in a vehicle, includes a locking bar configured to move into an engaged configuration which enables the access door to be placed and held into a closed position and a disengaged configuration which permits the access door to be placed
(Continued)

into an opened position; and an automatic locking mechanism including a shape memory alloy (SMA) actuator configured to be coupled to the access door, and further including a locking feature operably coupled to a portion of the locking bar, and configured to engage and disengage the SMA actuator which is electrically energized to move into a locked position to prohibit the locking feature from moving. A latch assembly for an access door of a storage compartment in a vehicle includes an SMA actuator configured to move the locking bar into the disengaged configuration with the storage compartment.

13 Claims, 13 Drawing Sheets

(51) Int. Cl.

| | | |
|---|---|---|
| E05B 77/44 | (2014.01) | |
| E05B 81/04 | (2014.01) | |
| E05B 81/16 | (2014.01) | |
| E05B 81/28 | (2014.01) | |
| E05B 81/42 | (2014.01) | |
| E05B 83/30 | (2014.01) | |
| F03G 7/06 | (2006.01) | |

(52) U.S. Cl.
CPC .............. *E05B 81/16* (2013.01); *E05B 81/28* (2013.01); *E05B 81/42* (2013.01); *E05B 83/30* (2013.01); *F03G 7/06143* (2021.08); *E05B 2047/0081* (2013.01); *Y10T 292/0834* (2015.04)

(58) Field of Classification Search
CPC ........... Y10T 292/699; Y10T 292/0834; Y10T 292/0836; Y10T 292/084; Y10T 292/0846; Y10T 292/1023; Y10T 292/1028; Y10S 292/04; F03G 7/0614
See application file for complete search history.

(56) References Cited

U.S. PATENT DOCUMENTS

| | | | | |
|---|---|---|---|---|
| 9,482,928 | B2* | 11/2016 | Perkins | ................. G02F 1/3501 |
| 10,364,593 | B2* | 7/2019 | Alexander | .............. E05B 85/20 |
| 10,378,250 | B2* | 8/2019 | Alacqua | ............... E05B 47/0009 |
| 10,407,949 | B2* | 9/2019 | Kim | ......................... E05C 7/04 |
| 10,731,382 | B2* | 8/2020 | Ketels | ..................... E05C 9/043 |
| 2004/0031301 | A1* | 2/2004 | Dominique | ............ E05B 41/00 70/237 |
| 2008/0007081 | A1 | 1/2008 | Shibata et al. | |
| 2017/0058567 | A1* | 3/2017 | Ivanovic | ............. E05B 47/0009 |
| 2020/0002979 | A1 | 1/2020 | Ketels et al. | |
| 2020/0378162 | A1 | 12/2020 | Ketels et al. | |

FOREIGN PATENT DOCUMENTS

| | | | | |
|---|---|---|---|---|
| DE | 102004015068 | A1 * | 10/2005 | ............... B60R 7/06 |
| DE | 102010009380 | A1 | 9/2011 | |
| DE | 102014222269 | A1 * | 5/2016 | ............. B60K 15/04 |
| DE | 202018103920 | U1 | 8/2018 | |
| EP | 1279784 | A1 * | 1/2003 | ......... E05B 47/0009 |
| EP | 1300532 | A1 * | 4/2003 | ......... E05B 47/0009 |
| EP | 1340870 | A1 | 9/2003 | |
| EP | 1918493 | A2 | 5/2008 | |

OTHER PUBLICATIONS

Written Opinion dated May 29, 2020 of International application No. PCT/EP2019/083273.

* cited by examiner

VEHICLE STORAGE COMPARTMENT LATCH ASSEMBLIES WITH SHAPE MEMORY ALLOY ACTUATOR

CROSS-REFERENCE TO RELATED APPLICATIONS

This application is a National Stage Entry of International Patent Application No. PCT/EP2019/083273, filed Dec. 2, 2019, which claims the benefit of priority to French Patent Application No. 1872147, filed Nov. 30, 2018, French Patent Application No. 1874089, filed Dec. 24, 2018, and U.S. Provisional Patent Application No. 62/870,042, filed Jul. 2, 2019, each of which is incorporated by reference in its entirety for all purposes.

TECHNICAL FIELD

The present disclosure relates generally to latch assemblies in vehicles and, more particularly, to vehicle storage compartment latch assemblies with at least one shape memory alloy (SMA) actuator for use with a central locking system of a vehicle.

BACKGROUND

Vehicles, such as passenger cars, vans and trucks, typically include various storage compartments, such as glove boxes or other storage compartments, capable of receiving various articles to be stored therein. For security purposes, it is often desirable to be able to lock an access door of such storage compartments when closed. For example, in such instances where vehicle windows are left unattended in a lowered position, a vehicle roof/convertible top is left unattended in a retracted/lowered position or a vehicle is broken into by a perpetrator, it is particularly advantageous for an access door of a storage compartment to be locked and remain locked when closed.

Access doors of storage compartments in vehicles typically include latch assemblies which are moveable into engaged and disengaged configurations which make it possible for the access door to be placed into respective closed and opened positions. Furthermore, some access doors of storage compartments in vehicles include latch assemblies with locking mechanisms which are manually lockable and unlockable by way of inserting and using a vehicle key. For example, when a locking mechanism of a latch assembly of an access door is manually locked by way of inserting and using a vehicle key when the access door is in a closed position, the latch assembly is not permitted to be moved into the disengaged configuration and therefore locks and retains the access door of the storage compartment into the closed position. As such, when the access door of the storage compartment is manually locked into the closed position, access into the storage compartment in the vehicle is prohibited.

However, the need to manually lock and unlock an access door of a storage compartment in a vehicle poses certain challenges and limitations. Besides requiring the extra manual steps of inserting and using a vehicle key to lock and unlock an access door of a storage compartment, a driver or passenger in a vehicle may not remember to manually lock the access door once again after being unlocked and placed back into a closed position. As such, access into the storage compartment may remain permissible, even though the driver or passenger may not be aware of this. Additionally, a driver or passenger in a vehicle, and particularly a driver sitting in a driver's seat, may find it inconvenient to lean over towards the access door of the storage compartment (e.g. a glove box) with a vehicle key to manually lock, unlock and/or open the access door, especially in larger vehicles.

EP 3 132 962 B1 discloses a flap or a glove compartment lid with an unlocking device with an actuator having a shape memory material. The SMA actuator can be placed directly at the flap and can change the shape along its longitudinal axis to drive a movable safety part.

With at least the aforementioned challenges and limitations in mind, there is a continuing unaddressed need to economically provide drivers or passengers the ability to automatically lock and unlock an access door of a storage compartment in a vehicle, thus not requiring the insertion and use of a vehicle key to manually lock and unlock the access door. Furthermore, there is a continuing unaddressed need to economically provide drivers or passengers the ability to open an access door of a storage compartment automatically, after the access door has been placed in a closed position, without needing to directly touch or make physical contact with any portion of the access door.

DISCLOSURE OF THE INVENTION

A first invention concerns a latch assembly for an access door of a storage compartment in a vehicle. The latch assembly comprises a locking bar configured to be movable into (i) an engaged configuration which enables the access door to be placed and held into a closed position and (ii) a disengaged configuration which permits the access door to be placed into an opened position and an automatic locking mechanism including a shape memory alloy (SMA) actuator configured to be coupled to the access door. The automatic locking mechanism further including a locking feature operably coupled to at least a portion of the locking bar. The locking feature is configured to engage and disengage the SMA actuator as the locking bar respectively moves between the engaged and disengaged configurations, wherein when the access door is placed into the closed position and the locking feature is engaged with the SMA actuator and the SMA actuator is electrically energized to move into a locked position to prohibit the locking feature from moving, the locking bar is prohibited from moving and locks the access door in the closed position.

The SMA actuator and the locking bar can be arranged at the access door, the locking feature being oriented with a central axis parallel to a central axis of the locking bar. The SMA actuator can have a receiving opening to receive the locking feature and can have a locking slider movable in a direction perpendicular to the central axis of the locking feature.

Another invention concerns a latch assembly for an access door of a storage compartment in a vehicle, the latch assembly comprises a locking bar configured to be movable into (i) an engaged configuration with the storage compartment, which enables the access door to be placed and held into a closed position and (ii) a disengaged configuration with the storage compartment, which permits the access door to be placed into an opened position. At least one shape memory alloy (SMA) actuator is provided, wherein when electrically energized, the at least one SMA actuator is configured to move the locking bar into the disengaged configuration with the storage compartment and permit the access door of the storage compartment to open.

The SMA actuator can comprise a support structure attached at the access door and a locking bar to be movable guided in the support structure. The locking bar can be connected to a SMA wire held in the support structure and the SMA wire can be electrically connected to an electrical power supply.

Further, the SMA wire can comprise two ends, each of the two ends of the SMA wire can be connected to a connector attached to the support structure. The locking bar can comprise a deflection point or a deflection pulley at which the SMA wire is deflected.

The locking bar can be provided with a slide cam interacting with an electrical switch fixed at the support structure witching off the electric current provided to the SMA actuator when the slide cam engages with the electrical switch.

The support structure can house two SMA wires connected to the support structure to operate two locking bars arranged at opposite ends of the support structure.

The movable locking bar can be engaged with the support structure in a first end position against a spring force of a preloaded biasing element, the first end position enabling an engaged configuration with the storage compartment, which enables the access door to be placed and held into a closed position.

Further, the movable locking bar can be engaged with the support structure in a second end position against a spring force of a preloaded biasing element and against the force of the SMA wire heated by an electric current, the second end position enabling a disengaged configuration with the storage compartment, which enables the access door to be placed into an opened position.

It has been found out that the SMA wire can be preloaded with a force lower than the force of the preloaded biasing element. This allows to keep the wire straight and the locking bars sufficiently safe in place at the same time.

The thickness of the SMA wire can be between 0.05 mm and 0.5 mm, preferably 0.25 mm. This allows a fair compromise between the strength of the SMA wire, the cooling time and the service life of the product and the actuation cycles.

A cooling time of the SMA wire heated to a temperature above the transformation temperature of the SMA wire to fall below the transformation temperature can be between 0, 1 and 2 s, preferably less than 1 s. This enables a sufficient fast repeated operation of the SMA actuator to be comfortable to a user.

The temperature can be measured with a thermocouple or by measuring the electric resistance of the SMA wire, which changes with its temperature.

A sufficient short cooling time can be achieved by a cooling rate of the SMA wire which is at least 30 K/s after having been heated up to 110° C.

A suitable material for the SMA wire can be a material out of NiTi.

Further, it has been found out that the locking bar of the SMA actuator can be engaged with the storage compartment by intermediary of a locking bar attached to the access door.

This allows to equip existing latch assemblies with locking bars at the access doors with an electric powered actuator, since the SMA actuator is sufficiently lightweight to be placed at the access door instead of at the storage compartment.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

FIG. 1B is a perspective view of the storage compartment of FIG. 1A illustrating the latch assembly with an exemplary automatic locking mechanism arranged in access door;

(FIG. 5) is a schematic representation of the construction example of an assembly for a locking/unlocking mechanism according to FIG. 24 (FIG. 1) seen in horizontal section the invention the actuator part.

DETAILED DESCRIPTION

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art.

Figure 1:
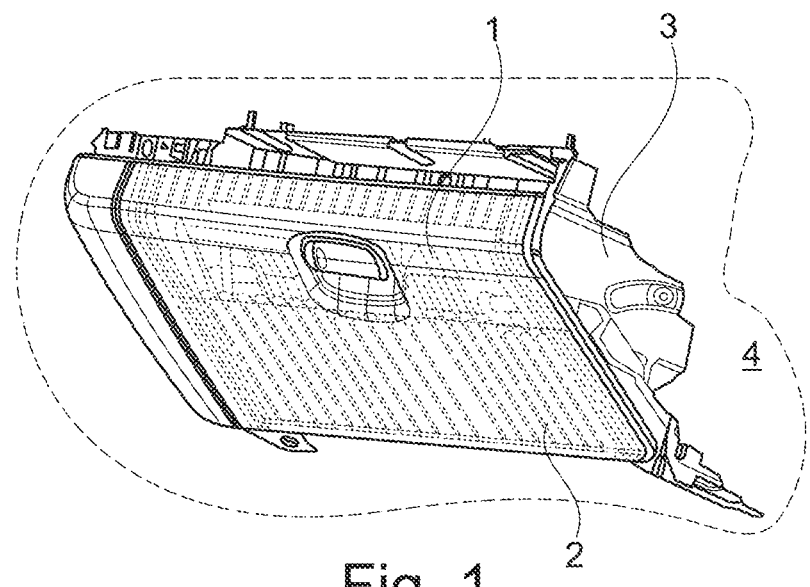
FIG. 1 is a perspective view of an exemplary storage compartment for a vehicle, further illustrating an exemplary access door of the storage compartment in a closed position with an exemplary latch assembly.
Figure 2:
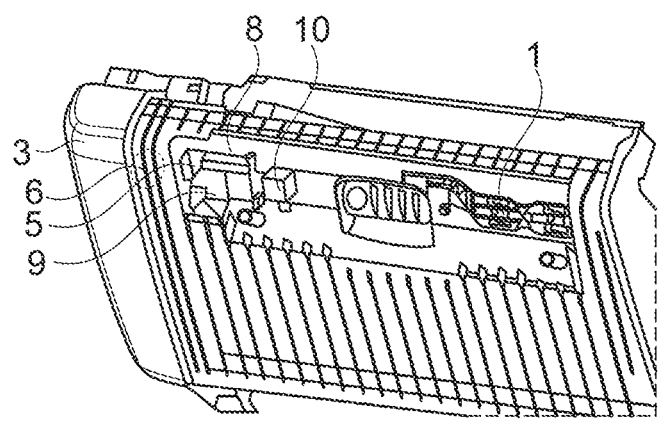
FIG. 2 is a perspective view of the storage compartment shown in FIG. 1, further illustrating the access door of the storage compartment with an outer cover removed to show an exemplary latch assembly with an exemplary automatic locking mechanism disposed within the access door.
Figure 3:
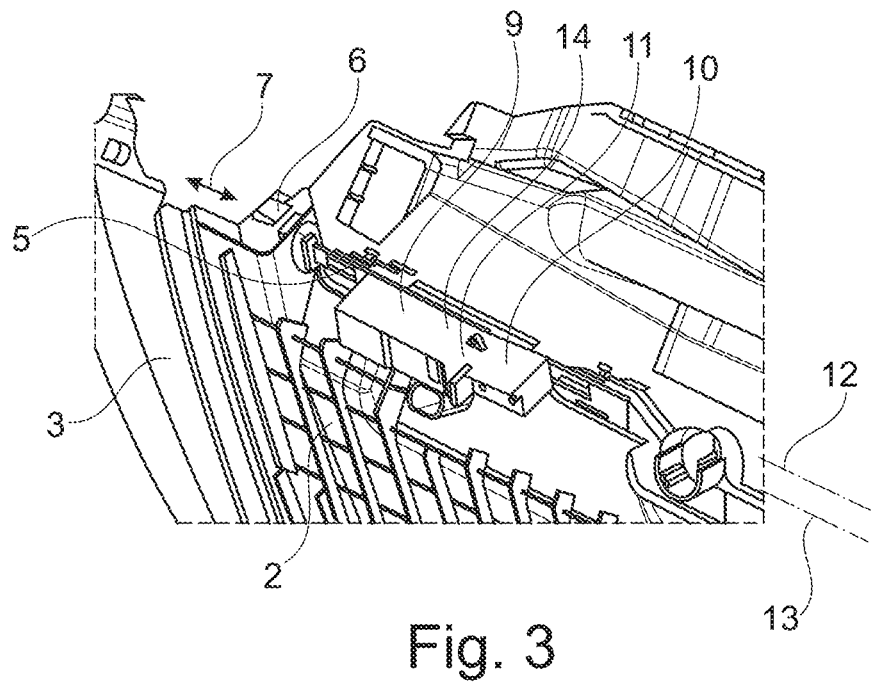
FIG. 3 is a perspective view of a portion of the latch assembly shown in FIG. 2, further illustrating a first sectional view of the automatic locking mechanism of the latch assembly disposed within the access door.
Figure 4:
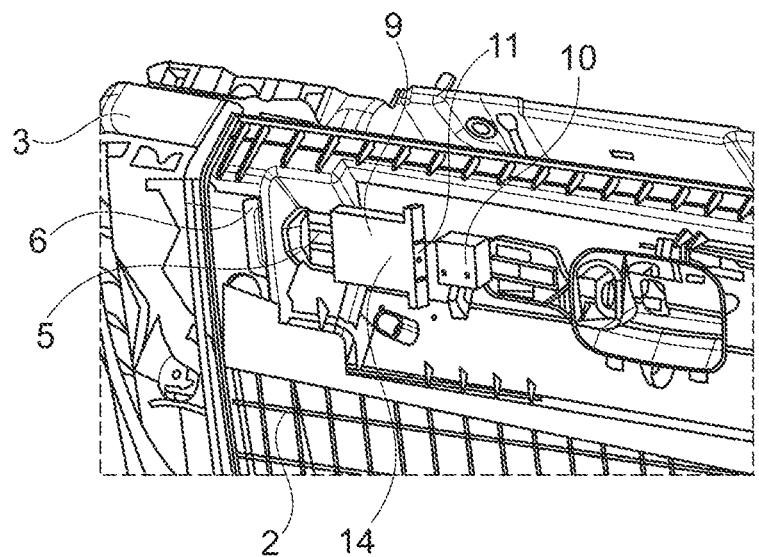
FIG. 4 is a perspective view of another portion of the latch assembly shown in FIG. 2, further illustrating a second sectional view of the automatic locking mechanism of the latch assembly disposed within the access door.

Referring generally to FIGS. 1-7B, there is shown an exemplary latch assembly 1 for an access door 2 of a storage compartment 3 in a vehicle 4, generally indicated by dotted lines around the storage compartment 3. As shown in FIG. 2, the latch assembly 1 includes a locking bar 5 arranged at the access door 2 and configured to be movable into an engaged configuration with an opening 6 at the storage compartment 3 which enables the access door 2 of the storage compartment 3 to be placed and held into a closed position, as shown in FIGS. 3 and 4.

It is easily understandable that the locking bar 5 can be moved by a transversal movement of the locking bar 5, indicated by the arrow 7, along a central axis 12 (FIG. 4) into a disengaged configuration (not shown) with the opening 6, which permits the access door 2 of the storage compartment 3 in the vehicle to be placed into an opened position (not shown) and give access to the storage compartment 3.

As further shown in FIGS. 2, 3 and 4 there is an automatic locking mechanism 8 including a shape memory alloy (SMA) actuator 9 configured to be coupled to the access door 2 of the storage compartment 3, the automatic locking mechanism further including a locking feature 10 operably coupled to at least a portion of the locking bar 5, the locking feature 10 configured to engage and disengage (not shown) the SMA actuator 9 as the locking bar respectively moves between the engaged and disengaged (not shown) configurations.

The access door 2 of the storage compartment 3 is placed into the closed position and the locking feature 10 is engaged with the SMA actuator 9. In one embodiment, the SMA actuator 9 is electrically energized to move into a locked position to prohibit the locking feature 10 from moving, the locking bar 5 is prohibited from moving and locks the access door 3 to the storage compartment 3 in the closed position.

In another embodiment, the SMA actuator 9 is electrically energized to move from a locked position into an unlocked position to enable the locking feature 10 to move with the locking bar 5 in a position, where the locking bar 5 is disengaged with the opening 6 allowing to open the door 2. Once the position of the SMA actuator from a locked position into an unlocked position is finished, the SMA actuator 9 is no longer electrically energized.

As shown in FIG. 3, the locking feature 10 has a protruding bolt 11 with a central axis 12 parallel to the central axis 13 of the locking bar 5, in the embodiment shown with an offset between the two central axis 12, 13.

Figure 5:
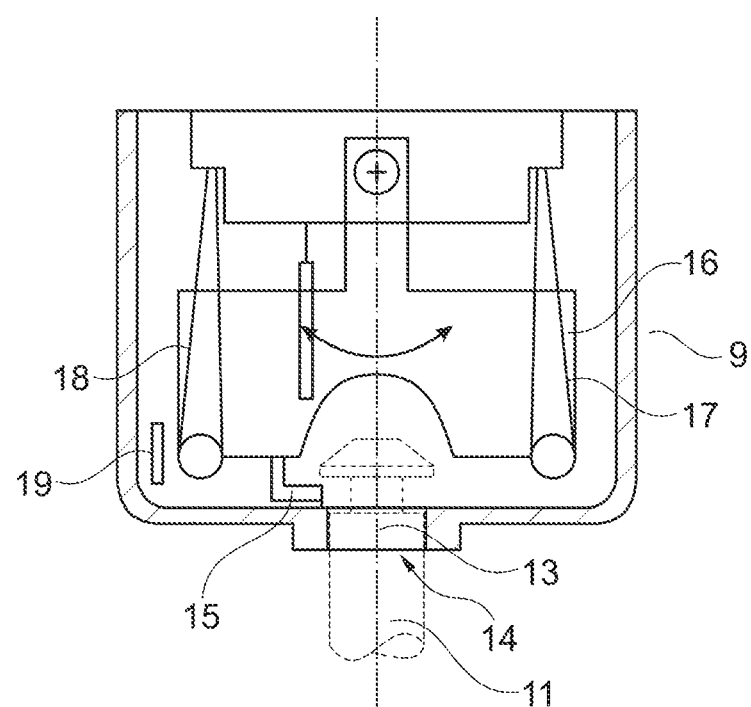
FIG. 5 is a top plan view of an exemplary shape memory alloy (SMA) actuator of the automatic locking mechanism of the latch assembly shown in FIGS. 2-4, further illustrating internal components of the SMA actuator.

As shown in FIG. 5, the SMA actuator 9 has a receiving opening 14 to receive the protruding bolt 11 of the locking feature 10 (FIG. 3, 4) and a locking slider 15 movable in a direction perpendicular to the central axis 13 of the locking feature. The locking slider 15 is operated when the SMA actuator 9 is electrically energized.

FIG. 5 also shows a rocker 16 which is moved by two alternately energized double SMA wires 17, 18. On the rocker 16 the locking slider 15 is mounted, which in turn dips laterally, i.e. essentially perpendicular to the longitudinal axis of opening 14, into opening 14 in order to block the movable bolt 11 from being pulled out of opening 14.

When one double SMA wire 17 is energized while the other double SMA wire 18 remains unenergized, the rocker 16 is pulled to its side due to the shortening of the double SMA wire 17 caused by the influence of heat. It is essential that, according to the principle of an antagonistic system, the system is self-holding in both end positions. These positions are called locked or unlocked, depending on whether the bolt 15 is in the opening 14 or not.

In addition, a sensor 19 is provided with which the position of the rocker 16, whether locked or not, can be determined. Since the bolt 11 is moved from outside the SMA actuator 9, a spring is not required to eject the bolt 11 out of the opening 14.

Figure 6:
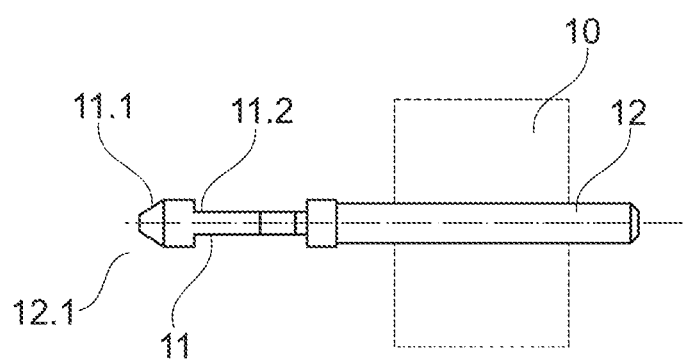
FIG. 6 provides a view of an exemplary locking feature of the automatic locking mechanism of the latch assembly shown in FIGS. 2-4.

In FIG. 6 the protruding bolt 11 of the locking feature 10 is shown in detail. FIG. 6 shows the bolt 11 to be moved in the opening 14 (FIG. 5). The bolt 11 is designed at one end 12.1 in such a way that it can be brought into the opening 14 (FIG. 5) even if the opening 14 is blocked y the locking slider 15.

For this, the end 12.1 at the outer circumference has a tapered ramp 11.1, at which the closed locking slider 15 (FIG. 5) rests on the circumference and slides along, when the bolt 11 is pushed into the opening 14.

A constriction 11.2 in the locking area of the bolt 11, which is set back in longitudinal direction compared to the ramp 11.1 arranged at the end 12.1, prevents the pin 11 from being pulled back as long as the locking slider 15 (FIG. 5) in its closed position is in engagement with the constriction 11.2. Rather bolt 11 can only be withdrawn if the locking slider 15 (FIG. 5) is in the open position laterally outside the constriction 11.2.

This design enables the operator to close the storage compartment even when the storage compartment is locked. On the other hand, the operator cannot open the storage compartment when it is locked.

Figure 7A:
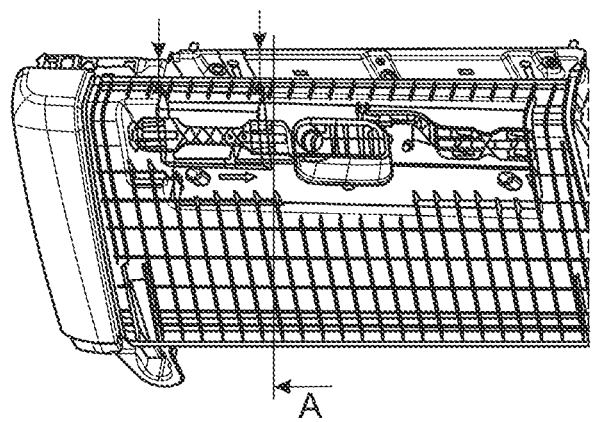
FIGS. 7A and 7B provide respective perspective and side views of the latch assembly shown in FIGS. 2-4, further illustrating dimensional regions of space in which the automatic locking mechanism of the latch assembly is disposed.
Figure 7B:
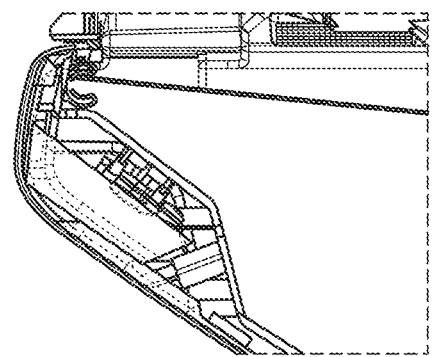

In FIG. 7A, B are represented further details of the invention illustrating dimensional regions of space in which the automatic locking mechanism of the latch assembly is disposed. It can be seen that the locking mechanism interacts with the locking bars.

Figure 8:
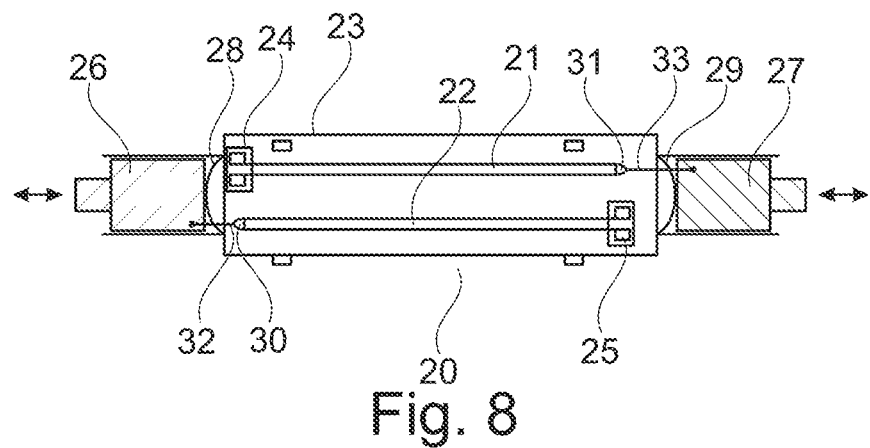
FIG. 8 is a schematic diagram illustrating another exemplary latch assembly with another exemplary shape memory alloy (SMA) actuator which may be disposed within an access door of a storage compartment for a vehicle.

Referring to FIG. 8, another exemplary latch assembly for an access door of a storage compartment in a vehicle is schematically shown. The latch assembly includes a locking bar configured to be movable into (i) an engaged configuration which enables an access door of a storage compartment in a vehicle to be placed and held into a closed position and (ii) a disengaged configuration which permits the access door of the storage compartment in the vehicle to be placed into an opened position; and at least one shape memory alloy (SMA) actuator, wherein when electrically energized, the at least one SMA actuator is configured to move the locking bar into the disengaged configuration and permit the access door of the storage compartment in the vehicle to open automatically.

In detail, FIG. 8 shows a schematic setup of a SMA actuator 20 operated with a SMA wire. The SMA actuator 20 is to be attached to the access door of the storage compartment (FIG. 1-4).

In this embodiment, two SMA wires 21, 22 are arranged in a parallel in a support structure 23, which will be attached at the access door (not shown). Each of the SMA wires 21, 22 comprises two ends 21.1, 21.2; 22.1, 22.2, each of the two ends 21.1, 21.2; 22.1, 22.2 is connected and mechanically fixed to a connector 24, 25. The connector 24, 25 is mechanically connected to the support structure 23. The SMA wires 21, 22 are electrically connected to an electrical power supply (not shown).

Each of the SMA wires 21, 22 are interacting with a respective locking bar 26, 27, the locking bars 26, 27 being movable guided in the support structure 23 in the manner of a piston and the locking bars 26, 27 are supported against a stop at the support structure 23 with an intermediate biasing element 28, 29.

Each of the locking bars 26, 27 is connected to the corresponding SMA wire 21, 22. The locking bars 26, 27 comprise a deflection point or a deflection pulley 30, 31 at which the corresponding SMA wire 21, 22 is bent and deflected. The deflection point or the deflection pulley 30, 31 is arranged at a connection piece 32, 33, which can be integral part of the locking bar 26, 27.

If heated by electricity, the SMA wires 21, 22 become short and the locking bars 26, 27 are moved in the support structure 23 towards each other in opposite directions against the force of the biasing element 27, 28. As a result of the movement of the locking bars, the end of the locking bar 26, 27, which protrudes laterally over the support structure 23, will disengage with the corresponding opening of the storage compartment and the access door can be opened (FIG. 2-4).

The FIGS. 9 to 18 further explain the concepts of the invention.

Figure 9:
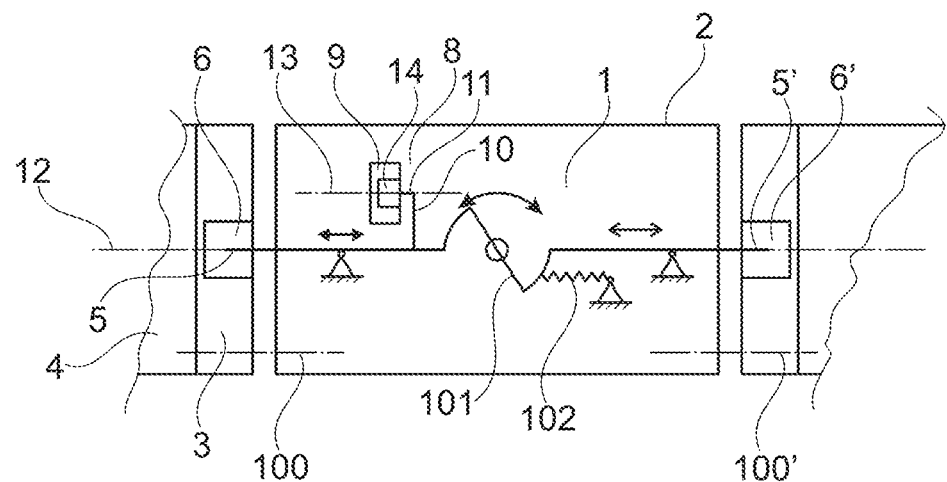
FIG. 9 is a schematic diagram illustrating the latch assembly of FIGS. 1 to 4 with locking bars in an engaged position.
Figure 10:
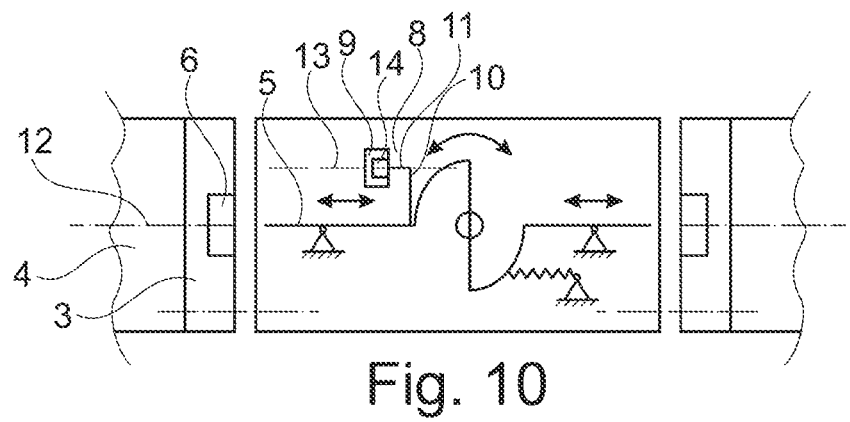
FIG. 10 is a schematic diagram illustrating the latch assembly of FIG. 9 with locking bars in a disengaged position.

In FIGS. 9 and 10 the latch assembly 1 with the automatic locking mechanism 8 coupled to the access door 2 of the storage compartment 3 in the vehicle 4 is shown in a closed (FIG. 9) and in an opened status (FIG. 10), the access door 2 itself remaining in the closed position. To open the access door, the access door would be turned around lower axis, indicated in point dotted lines 100 and 100'.

The difference between the closed and the opened position of the latch assembly 1 and the locking mechanism 8 is the engagement of the locking bar 5 of the access door 2 in the opening 6 of the storage compartment 3 of the vehicle 4 and at the same time of the bolt 11 of the locking feature 10 in the opening 14 of the SMA actuator 9.

In the opened position the locking bar 5 has been displaced to disengage the opening 6 and the same time the bolt 11 has left the opening 14 of the SMA actuator 9. It is easy to understand that if the bolt 11 is blocked from movement, the locking bar 5 cannot move neither.

It can be seen that the central axis 13 of the bolt 11 has an offset with the central axis 12 of the locking bar 5 and is parallel to the central axis 12 of the locking bar 5.

Further, the principle mechanism of such a latch assembly 1 is shown. There are two locking bars 5, 5' protruding at each side of the access door 2 into corresponding openings 6, 6' of the storage compartment 3. Both locking bars 5, 5' are connected to each other in a way, that moving one locking bar in one direction moves the other locking bar in the opposite direction. This can be realized by providing a rotatable coupling piece 101 connected to each of the locking bars 5, 5' and further connected to a biasing element such as a spring 102, coupled to the access door 2, to keep the latch assembly 1 in a defined position of the engaged locking bars 5, 5' when not action is initiated. Turning the coupling element 101 in clockwise direction make the locking bars 5, 5' moving towards each other against the force of the spring 102. Those movements are indicated by the arrows.

Figure 11:
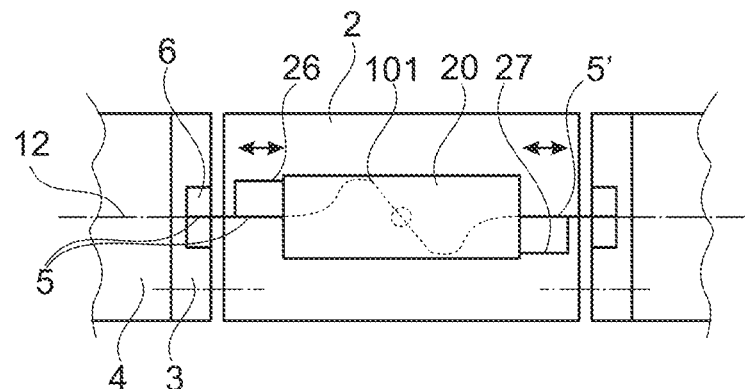
FIG. 11 is a schematic diagram illustrating another latch assembly using a SMA actuator to move the locking bars automatically with locking bars in an engaged position.
Figure 12:
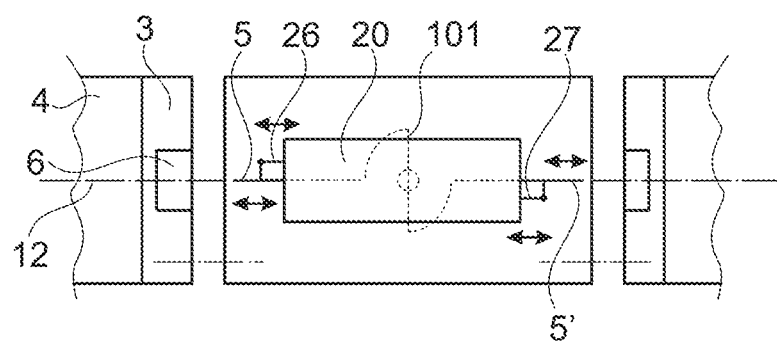
FIG. 12 is a schematic diagram illustrating the latch assembly of FIG. 11 with locking bars in a disengaged position.

In FIGS. 11 and 12 the latch assembly 1 of FIGS. 9 and 10 has been modified by making use of a SMA actuator 20 instead of a mechanical movement of the coupling piece 101, especially of a rotation. The SMA actuator 20 has two locking bars 26, 27 which are connected to the corresponding locking bars 5, 5' placed at the access door 2. The same biasing element (not shown) is used to maintain the locking bars 5, 5' and the two locking bars 26, 27 of the SMA actuator 20 in place, so it is not necessary, although possible, to provide the SMA actuator 20 with the biasing element 28, 29 of FIG. 8. It can easily be understood that it is sufficient that the SMA actuator 20 acts on one locking bar 5, 5' only, since they are positively coupled via the coupling piece 101.

Figure 13:
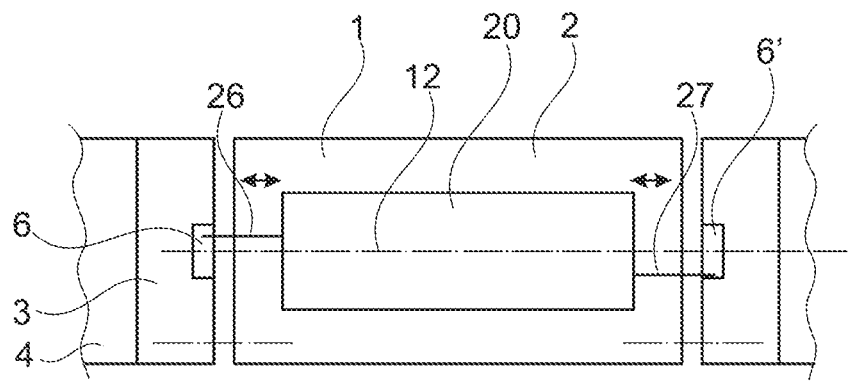
FIG. 13 is a schematic diagram illustrating another latch assembly using a SMA actuator with locking bars, shown in an engaged position.

In FIG. 13 the latch assembly 1 avoids the linkage mechanism with the locking bars 5, 5' arranged at the access door 2 and instead includes a SMA actuator 20 with locking bars 26, 27 protruding over the support structure 23 and engaging with the openings 6, 6' in the storage compartment 3 of the vehicle 4. In this configuration both locking bars 26, 27 are necessary to lock the access door 2 to the storage compartment 3. Again, the locking bars 26, 27 can have an offset to each other and/or the a central axis 12.

Figure 14:
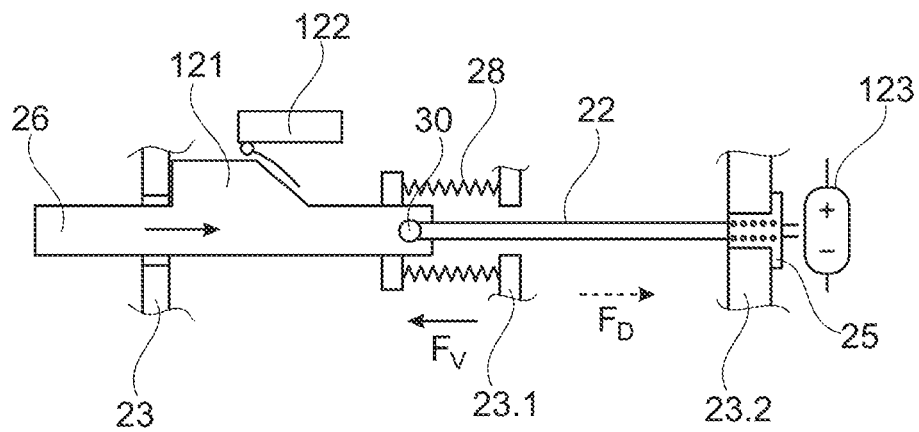
FIG. 14 is a schematic diagram illustrating a locking bar of the SMA actuator of FIG. 13 provided with a slide cam and interacting with an electrical switch.

In FIG. 14 the locking bar 26 is provided with a slide cam 121 interacting with an electrical switch 122 switching off the electric current provided to the SMA wire 22 of the SMA actuator when the slide cam 121 engages with the electrical switch 122. The electrical switch is fixed at the support structure 23 and the locking bar 26 is movable against the support structure and against a biasing element 28, which is arranged between the support structure 23.1 and the locking bar 26. As described for FIG. 8, the locking bar 26 is connected to the SMA wire 22 at a deflection point or at a deflection pulley 30 and the SMA wire 22 is connected and mechanically fixed to the connector 25, which is arranged in the support structure 23.2.

The connector 25 can be electrically connected to the power supply 123 to provide electrical energy to the SMA wire 22 for heating the SMA wire 22 above the transition temperature to reduce the length of the SMA wire 22 to move the locking bar 26 with a force $F_D$ against the force $F_V$ of the biasing element 28.

Figure 15:
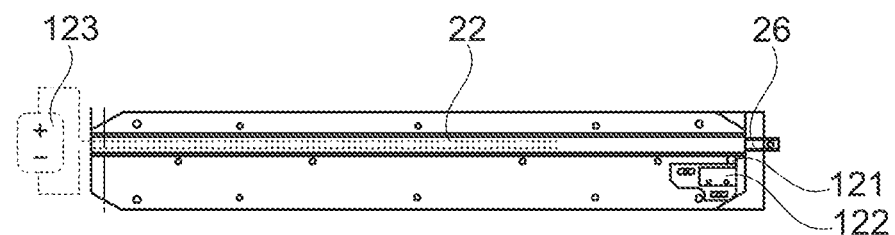
FIG. 15 is a schematic diagram illustrating a locking bar of a SMA actuator provided with a support structure for one SMA wire and a locking bar on one side only.

In FIG. 15, the SMA actuator 20 is provided with a support structure 23 and with a locking bar 26 protruding over the support structure 23 on one side only and with a slide cam 121 at the locking bar 26 interacting with the electrical switch 122. Inside the support structure 23 is a SMA wire 22 connected to a power supply 123. Upon providing electrical energy to the SMA wire 22, the SMA wire is heated and the length is shortened once the transition temperature is reached. The locking bar 26 is withdrawn in the support structure 23 and the slide cam 121 activates the electrical switch 122 after a predefined position has been reached. In this position, the power supply can be stopped providing electrical energy to the SMA wire 22 and the SMA wire will stop heating up and will cool down.

Figure 16:
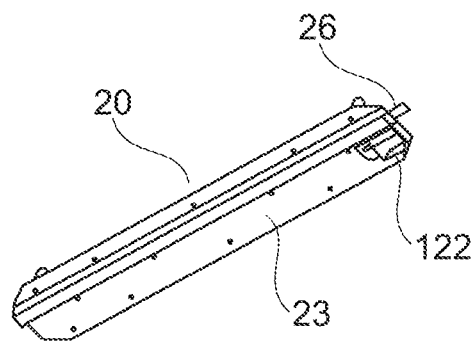
FIG. 16 is a perspective view of the SMA actuator of FIG. 15 with an electrical switch operated by a slide cam at the locking bar.

In FIG. 16 there is shown a perspective view on the support structure 23 of the SMA actuator 20. The locking bar 26 protrudes over the support structure 23 and the electric switch 122 is not activated.

Figure 17:
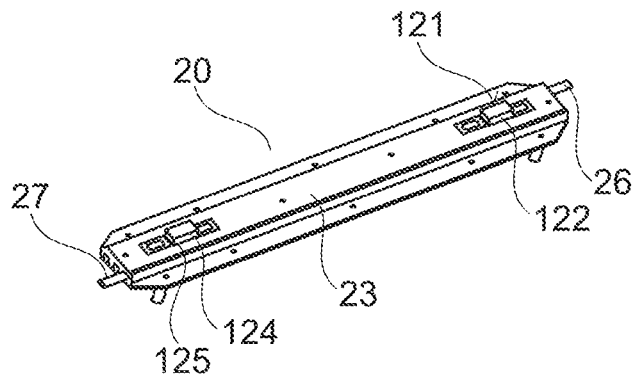
FIG. 17 is a schematic diagram illustrating a locking bar of a support structure of an SMA actuator as in FIGS. 15 and 16 but with two SMA wires and locking bars on two sides.

FIG. 17 there is shown a perspective view on another SMA actuator 20. At the support structure 23 there are two electric switches 123, 124 interacting with slide cam 121, 125 provided at the corresponding locking bars 26, 27. The locking bars 26, 27 are oriented parallel to each other and they are operated each by a SMA wire inside the support structure 23.

Figure 18:
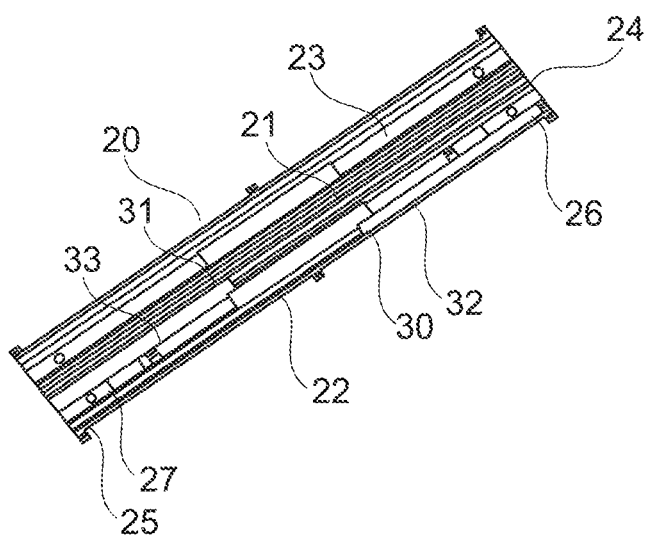
FIG. 18 a view on the SMA actuator as shown in FIG. 17 showing two SMA wires connected to the support structure on one side and to a locking bar on the other side, the locking bars being retracted.

FIG. 18 shows the SMA actuator 20 with two locking bars 26, 27 arranged on opposite sides of the support structure 23, the locking bars 26, 27 being retracted by the SMA wires 21, 22 connected by the connection pieces 31, 32 to the locking bars 26, 27. The SMA wires 21, 22 are deflected in the deflection point or a deflection pulley 30, 31 located at the connection pieces 31, 32 so that both ends 21.1, 21.2; 22.1, 22.2 (FIG. 8) are housed in a connector 24, 25 connected to the support structure 23. The connector 24, 25 can be coupled to a power supply to provide an electrical current to heat the SMA wires 21, 22.

Other than shown in FIG. 8, there is no biasing element, since the SMA actuator 20 of FIGS. 17 and 18 is intended to be used in a latch assembly as explained in FIGS. 11 and 12 with a biasing element as shown in FIGS. 9 and 10.

Another embodiment relates to the field of locking and unlocking mechanisms and more particularly to the locking and unlocking mechanisms of a panel for closing a storage space.

In the passenger compartment of a vehicle, it is common to provide storage space integrated into a part of the dashboard and at least partially closed by a partition panel such as a hatch or cover. The partition panel shall then be so arranged that it can be held in the closed position so that the compartment formed by the storage space is independent of the volume of the passenger compartment.

According to a known design example, the locking mechanism of the partition panel in a storage space closing position, i.e. in a storage space opening closing position, involves a simple clipping mechanism comprising a part which, by elastic deformation, cooperates with a door latch of the housing. However, this type of construction, which is based on the deformation of a part, is likely to have an operating efficiency that deteriorates over time, or even to break.

In addition, the actuation of the partition panel locking mechanism requires the presence of an interface for operating the mechanism on the outside of the partition panel. The presence of such an operating interface then imposes additional constraints on the design and aesthetics of the partition panel.

The purpose of this embodiment is to overcome this disadvantage of the anterior art by proposing a mechanism that, on the one hand, optimizes the locking of the flap in the closed position of the storage space and, on the other hand, allows easy unlocking with improved operational durability, while allowing the constraints associated with the presence of an operating interface on the outside of the partitioning panel to be overcome.

The embodiment thus has as its object an assembly for a mechanism for locking/unlocking a part movable with respect to a fixed part, characterized in that the assembly comprises a support structure on which are mounted at least:
- a pair of translational bolts associated with a return to position device, at least one bolt carrying a support surface,
- a device for coordinating the translation of the bolts in opposite directions,
- a drive cam with a slope forming an interface resting against the bolt support surface,
- an actuating part mounted so as to be pivotable about an axis and cooperating with the drive cam via a gearbox.

Support Surface

The embodiment also concerns a mechanism for locking/unlocking a moving part with respect to a fixed part, characterized in that the mechanism comprises, on the one hand, a first assembly according to the embodiment and, on the other hand, a second assembly comprising a second support structure comprising at least one striker, the striker being configured to cooperate with the bolt of the first assembly.

The embodiment also concerns a system characterized in that the system includes:
- a fixed part taken as a reference and in relation to which a moving part is movable,
- a locking/unlocking mechanism according to the embodiment configured such that, on the one hand, the first support structure is mounted on or integrated into the structure of a first part among the fixed and movable part and, on the other hand, the second support structure is mounted on or integrated into the structure of the second part among the fixed and movable part.

Figure 19:
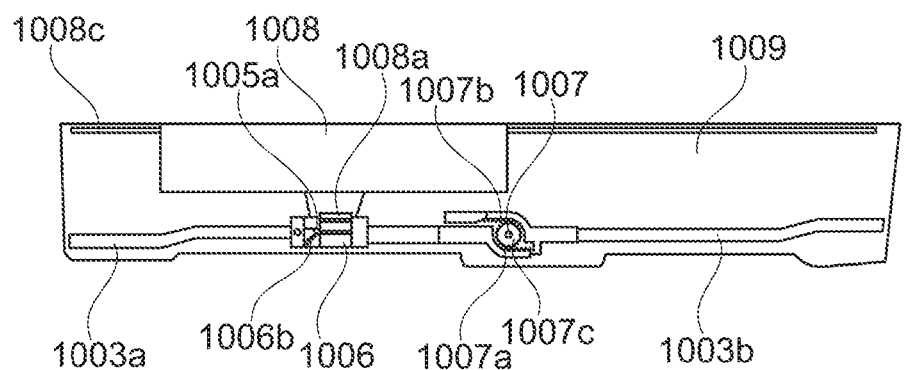
FIG. 19 (FIG. 1) is a schematic representation of a first example of the construction of an assembly for a locking/unlocking mechanism according to the invention.

The embodiment will be better understood, thanks to the following description, which refers to a preferred mode of realization, given as an example without limitation, and explained with reference to the attached schematic drawings, in which:

FIG. 19 (FIG. 1) is a schematic representation of a first example of the construction of an assembly for a locking/unlocking mechanism according to the embodiment.

Figure 20:
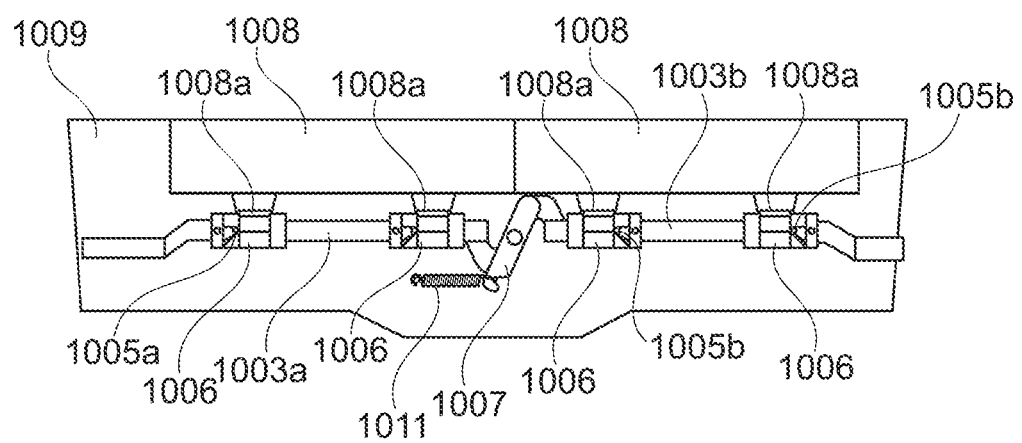
FIG. 20 (FIG. 2) is a schematic representation of a second example of the construction of an assembly for a locking/unlocking mechanism according to the invention.
Figure 21:
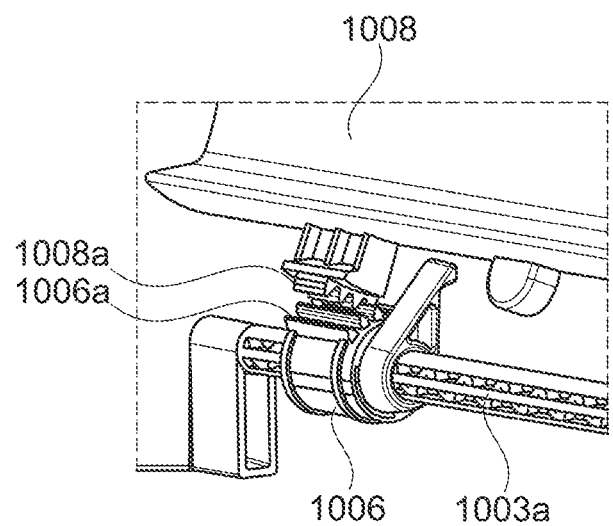
FIG. 21 (FIG. 3) is a schematic representation of a first position when cooperating an actuating part with a drive cam according to an example of an assembly construction for a locking/unlocking mechanism according to the invention.

FIG. 20 (FIG. 2) is a schematic representation of a second example of the construction of an assembly for a locking/unlocking mechanism according to the embodiment FIG. 21 (FIG. 3) is a schematic representation of a first position when cooperating an actuating part with a drive cam according to an example of an assembly construction for a locking/unlocking mechanism according to the embodiment.

Figure 22:
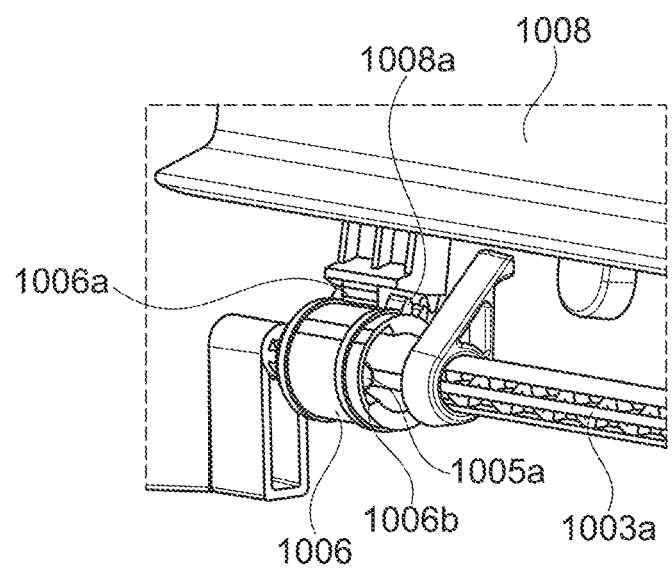
FIG. 22 (FIG. 4) is a schematic representation of a second position when cooperating an actuating part with a drive cam according to the same example of construction of an assembly for a locking/unlocking mechanism according to the invention.

FIG. 22 (FIG. 4) is a schematic representation of a second position when cooperating an actuating part with a drive cam according to the same example of construction of an assembly for a locking/unlocking mechanism according to the embodiment.

Figure 23:
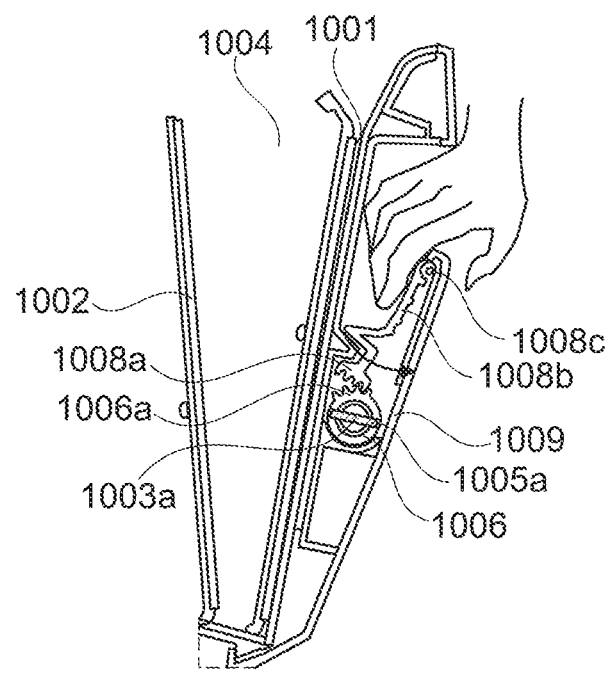
FIG. 23 (FIG. 5) is a schematic representation of an example of a user's interaction with the actuator part of an example of an assembly construction for a lock/unlock mechanism according to the invention.

FIG. 23 (FIG. 5) is a schematic representation of an example of a user's interaction with the actuator part of an example of an assembly construction for a lock/unlock mechanism according to the embodiment.

The embodiment concerns an assembly for a locking/unlocking mechanism of a movable part 1001 with respect to a fixed part 1002, characterized in that the assembly comprises a support structure 9 on which are mounted at least:
- a pair of bolts 1003a, 1003b mounted in translation and associated with a return device 3011 in position, at least one bolt 1003a, 1003b carrying a support surface 1005a, 1005b,
- a coordination device 1007 for the translation of bolts 1003a, 1003b in opposite directions,
- a drive cam 1006 with a slope providing an interface 1006b resting against the bearing surface 1005a, 1005b of the bolt 1003a, 1003b
- an actuator part 1008 mounted so as to be pivotable about an axis 1008c and cooperating with the drive cam 1006 via a gearbox.

The embodiment also concerns a mechanism for locking/unlocking a movable part 1001 with respect to a fixed part 1002, characterized in that the mechanism comprises, on the one hand, a first assembly according to the embodiment and, on the other hand, a second assembly comprising a second support structure comprising at least one striker, the striker being configured to cooperate with the bolt 1003a, 1003b of the first assembly.

The assembly according to the embodiment, also mentioned as the first assembly of the embodiment mechanism, has the advantage of involving a closing by means of a locking point at each of the bolts 1003a, 1003b to interact with a respective strike carried by a second assembly. Closing is achieved by coordinating the locking of each of the bolts 1003a, 1003b, which move together thanks to a dedicated coordination device 1007. The translation of the bolts 1003a, 1003b in opposite directions allows the positioning of locking points at different edges of the junction between fixed part 1002 and moving part 1001. Also, from a single drive cam 1006, the locking and unlocking of the entire mechanism is carried out at two contact points respectively made by bolts 1003a, 1003b. In addition, according to a design example, the return device 1011 in the position of bolt 1003a, 1003b is made by a spring which includes a first part associated or fixed to a bolt 1003a, 1003b and a second part associated or fixed to the support structure 1009 on which the bolt 1003a, 1003b is mounted.

According to a design example, the coordination device 1007 for the translation of bolts 1003a, 1003b includes a gearwheel 1007c, an interface 1007a, 1007b carried by each of the bolts 1003a, 1003b to interact with the gearwheel 1007c. The interfaces 1007a, 1007b of the bolts include gear surfaces arranged to cooperate with the gearwheel 1007c of the coordination device 1007. The respective interfaces 1007a, 1007b of the bolts 1003a, 1003b are arranged opposite and separated by the gearwheel 1007c so that the rotation of the gearwheel 1007c allows to coordinate the movement of the bolts 1003a, 1003b in opposite directions. In addition, this construction allows, in addition to coordinating the respective translations of the bolts 1003a, 1003b, to drive the movement of the two bolts 1003a, 1003b by activating the translation of only one of them. Such a gear train realized by the cooperation of interfaces 1007a, 1007b carried by each of the bolts 1003a, 1003b with a toothed wheel 1007c realizes a device for the transmission of a translation force in opposite directions that presents a reliability over time, while ensuring a reduction in friction and an optimization of fluidity in the movement of movement of each of the parts.

According to an example of alternative construction, the coordination device 1007 for the translation of bolts 1003a, 1003b includes a lever arm mounted so as to pivot about an axis of rotation, each end of the lever arm cooperating with the end of a respective bolt 1003a, 1003b. According to a particularity of this example of construction, on the one hand, the axes of each of the bolts 1003a, 1003b are arranged so as to be in the same plane as the plane of rotation of the lever arm respectively and, on the other hand, the ends of the respective structures of each of the bolts 1003a, 1003b have interaction points with the lever arm offset laterally with respect to the respective main axis of each of the structures of the bolts 1003a, 1003b.

According to a classic design example, bolts 1003a, 1003b are arranged in parallel or even confused axes. However, according to an advantage of the coordination device 1007, which ensures a joint translation of the bolts 1003a, 1003b, this device allows the construction of an arrangement of the entire embodiment according to which the positioning of the bolts 1003a, 1003b between them is carried out, on the one hand, in a plane perpendicular to the axis of rotation of the gear wheel 1007c of the coordination device 1007 and, on the other hand, according to non-parallel translation axes.

At least one of the bolts 1003a, 1003b, includes a support surface 1005a, 1005b configured to cooperate with the slope 1006b of a drive cam 6 arranged such that a pivot of the cam 6 exerts a pressure against the support surface 1005a, 1005b to impose an axial translation of the bolt 1003a, 1003b. According to an example of the unlimited construction of the embodiment, this bearing surface 1005a, 1005b is designed in the form of a finger or a shape projecting from the structure of the bolt 1003a, 1003b.

According to a particular example of the embodiment, the drive cam 1006 is made by a cylindrical cam mounted so that it can pivot about an axis parallel to the axis of translation of the bolt 1003a, 1003b. A particular construction of the embodiment consists in positioning the bolt 1003a, 1003b through the cylindrical cam 1006 so as to provide a support surface 1005a, 1005b of the bolt 1003a, 1003b in interaction with the slope 1006b of the drive cam 1006. also, the axial pivoting of the drive cam 1006 moves its slope 1006b so as to increase or release the pressure exerted by the slope 1006b against the support surface 1005a, 1005b of the bolt 1003a, 1003b, which leads to the axial movement of the bolt 1005a, 1005b. When the slope 1006b increases the pressure against the bearing surface 1005a, 1005b of the bolt 1003a, 1003b, the slope 1006b pushes the bolt 1003a, 1003b in axial displacement against the force exerted by the return device 1011 in position. On the other hand, when the slope 1006b releases the bolt 1003a, 1003b in axial displacement, the bolt 1003a, 1003b returns to position under the effect of the force exerted by the return device 1011 in position.

The movement of drive cam 1006 involves an actuating part 1008 which bears on its structure or is associated with at least a portion of a gear part to cooperate by mechanism or directly with drive cam 1006. Thus, a movement of the actuating part 1008 moves the drive cam 1006 together. According to a preferred construction example of the embodiment, actuator part 1008 is associated with a return to position device such as a spring mechanism.

According to a particular example of the embodiment, the cooperation of drive part 1008 with drive cam 1006 is carried out by at least one gearwheel portion 1008a carried by drive part 1008 which interacts with a gearwheel portion 1006a carried by a peripheral surface of drive cam 1006. According to an example of the construction of this gearwheel carried by the drive cam 1006, when the drive cam 1006 is a cylindrical cam, the part of the drive cam 1006 that carries the gearwheel portion 1006a is formed by at least a part of the peripheral surface, for example a strip making a cylinder portion about the pivot axis of the drive cam 6 and thus at the axial translation axis of at least one bolt 1003a, 1003b.

According to a first example of the construction of the interaction between the gear wheels 1006a, 1008a carried by the drive cam 1006 and the actuating part 1008, the latter is operated directly without any intermediary. According to an example of alternative construction, this interaction between the sprockets 1006a, 1006b involves an intermediate structure or mechanism such as a gear made by several sprockets and/or a transmission structure such as a chain, belt or rack.

According to a particular example of the embodiment being made, actuation part 1008 is made in the form of a mechanical lever comprising, on the one hand, a cooperation interface 1008a with the drive cam 1006 and, on the other hand, a user's support interface 1008b. This construction allows a user to exert pressure on the 1008b support interface in order to swing the actuator part 1008 around its 1008c pivot axis. In conjunction with this switchover, the cooperation interface 1008a rotates around the pivot axis 1008c. When this cooperation interface 1008a has at least one gearwheel portion, this gearwheel portion 1008a is centred on the pivot axis 1008c of the actuator part 1008 so that the toggle of the cooperation interface 1008a jointly drives the rotation of the gearwheel 1006a about its axis to rotate the cylindrical drive cam 1006. According to a design example, actuator part 1008 operates by a pressure displacement by a user so that the return to position of actuator part 1008 is carried out by a return mechanism, such as a spring. Such a construction makes it possible to achieve operation with a smaller pivoting range and to limit the space required for a user's intervention in relation to an operating part that would operate by a tensile displacement.

According to a first design variant, the two interfaces 1008a, 1008b of the actuating part are positioned on either side of the pivot axis of the actuating part 1008; according to a second design variant, the two interfaces 1008a and 1008b of the actuating part are positioned on the same side with respect to the pivot axis of the actuating part 1008. In each of the design variants, the return to position mechanism is positioned to interact at a part of the actuating part, so as to resist a pressure force exerted by a user at the user's support interface 1008b.

According to a particularity of the operation of the embodiment that can be combined with the various previously detailed characteristics, the movement of the drive cam 1006, which causes the translation of the bolts 1003a, 1003b, is configured to disengage the bolts 1003a, 1003b from their respective strikes and simultaneously unlock the mechanism. Also, the action of an actuating part 1008 with the gearwheel 1006a of the drive cam 1006 generates an unlocking of the mechanism.

According to a particular design example, each of the bolts 1003a, 1003b is associated with a respective drive cam 1006 configured to be moved by a particular drive part 1008, or alternatively associated with several drive cams 1006 configured to be moved by the same drive part 1008. According to a particularity of this design example, the slopes of the respective drive cam 1006 of each of the bolts 1003a, 1003b are oriented in opposite directions. Thus, the drive cams 1006 are positioned so that the slope 1006b of a first bolt 1003a, 1003b pushes the corresponding bearing surface 1005a, 1005b in the direction of the second bolt 1003a, 1003b. The joint movement of the two bolts 1003a, 1003b is carried out under the action of the coordination device 1007 so that the axial translation of the second bolt 1003a, 1003b is not blocked by the associated drive cam 1006. Also, according to this example of construction, each of the bolts 1003a, 1003b is capable of being driven in motion under the direct effect of the pivoting of the associated drive cam 1006 or the coordination device 1007. Thus, according to the same design example, each of the bolts 1003a, 1003b is capable of being driven in motion under the indirect effect of the pivoting of the drive cam 1006 associated with the second bolt 1003a, 1003b via the coordination device 1007.

According to a particular design feature, when the mechanism of the embodiment includes several actuation parts 1008 juxtaposed as shown in FIG. 2 and with the same latch 1003a, 1003b associated with several drive cams 1006 configured to be moved under the effect of the same actuation part 1008, the cooperation between, on the one hand, the gearwheel portions 1006a of the cylindrical cams 1006 and, on the other hand, the gearwheel portions 1008a carried by the actuating parts 1008 has a clearance allowing an offset of the respective pivot axes of the actuating parts 1008. Such clearance in the gear between the gearwheel portions 1006a, 1008a thus allows the actuator parts 1008 juxtaposed against a wall with a curvature to be mounted.

According to a construction feature of the bolts 1003a, 1003b of the mechanism which is not restrictive of the embodiment, the end of these bolts 1003a, 1003b intended to cooperate with a striker in the context of a locking system includes a ramp or bevel arrangement. This construction allows, when the mechanism is locked, the translation of the bolts 1003a, 1003b pushed under the action of the outer edge of the strike against the ramp of the bolt 1003a, 1003b until the bolt 1003a, 1003b is in position to be inserted into the inner housing of the strike. This particular construction makes it possible to facilitate the locking of moving part 1001 with fixed part 1002 by simply moving the parts closer together without the bolts 1003a, 1003b needing to be moved under the action of drive parts 1006 in the absence of this construction feature, the bolts 1003a, 1003b must be moved by pivoting at least one drive cam under the action of moving an actuating part 1008.

The embodiment also concerns a system incorporating a locking/unlocking mechanism depending on the embodiment, characterized in that the system includes:
- a fixed part 1002 taken as a reference and with respect to which a moving part 1001 is movable,
- a locking/unlocking mechanism according to the embodiment configured such that, on the one hand, the first support structure 1009 is mounted on or integrated into the structure of a first part among fixed part 1002 and movable part 1001 and, on the other hand, the second support structure is mounted on or integrated into the structure of the second part among fixed part 1002 and movable part 1001.

Thus, according to a particular example of the construction of this system illustrated in the figures, the support structures are made by a part of the parts, movable 1001 and fixed 1002, intended to be locked. Thus, the elements that make up the first assembly of the locking mechanism are mounted on the moving part 1001 that forms the support structure 1009.

According to a particular example of construction of the embodiment system, fixed part 1002 is made by a dashboard of a vehicle that carries the opening of a storage space 1004 and movable part 1001 is made by the storage closure panel 1004. according to a specificity of this particular example, the first set of the locking mechanism of the embodiment is positioned on the inside face of the storage space closure panel.

According to a first construction variant, the panel that produces moving part 1001 only partially closes the storage opening, and at least one actuator part 1008 is positioned on the inside face of moving part 1001 made by the storage panel. According to this first construction variant, a user's 1008b support interface is accessible to a user's hand slipped into the spacing of the storage hole that is not sealed by the panel. Thus, the entire mechanism of the embodiment, including the user's 1008b support interface, remains invisible from outside the glove compartment, i.e. from the vehicle's passenger compartment.

According to a second construction variant, the panel that produces moving part 1001 comprises, on the one hand, a first wall that completely closes the opening of storage 1004 and, on the other hand, a second wall positioned in a plane substantially parallel to that of the first wall and on the side of the first wall opposite the storage space 1004 and oriented towards the user. The second wall of the panel has a dimensioning of its surface leaving an opening allowing access to the space between the two parallel walls of the panel for one hand of a user. According to this second construction variant, a user's 1008b support interface is mounted in the space between the two parallel walls of the panel.

According to an example of a specific complementary construction, the strikers that form the second assembly are made by housings whose openings are positioned at the junction between the movable panel and the dashboard that carries the storage space opening.

According to different design variants, the panel is mounted on the dashboard in the form of a swivel joint, as for example in the case of a glove box type storage, or alternatively in the form of a sliding joint, as for example in the case of a drawer type storage.

Of course, the embodiment is not limited to the methods of making it described and represented in the attached drawings. Changes remain possible, in particular with regard to the constitution of the various elements or by substitution of technical equivalents, without leaving the field of protection of the embodiment.

1. Assembly for a mechanism for locking/unlocking a movable part (1001) with respect to a fixed part (2), characterized in that the assembly comprises a support structure (1009) on which are mounted at least:
- a pair of bolts (1003a, 1003b) mounted in translation and associated with a return device (11) in position, at least one bolt (1003a, 1003b) carrying a support surface (1005a, 1005b),
- a coordination device (1007) for coordinating the translation of the bolts (1003a, 1003b) in opposite directions,
- a drive cam (1006) having a slope providing an interface (1006b) in contact with the bearing surface (1005a, 1005b) of the bolt (1003a, 1003b),
- an actuating part (1008) pivotably mounted about an axis (1008c) and cooperating with the drive cam (1006) via a gearbox.

2. Assembly for the locking/unlocking mechanism according to claim 1, characterized in that the drive cam (1006) is formed by a cylindrical cam pivotally mounted about an axis parallel to the bolt translation axis (1003a, 1003b).

3. Assembly for a locking/unlocking mechanism according to one of the preceding claims, characterized in that the cooperation of the actuating part (1008) with the drive cam (1006) is carried out by at least one gear wheel portion (1008a) carried by the actuating part (1008) which interacts with a gear wheel portion (1006a) carried by a peripheral surface of the drive cam (1006).

4. Assembly for a locking/unlocking mechanism according to one of the preceding claims, characterized in that the actuating part (1008) is designed as a mechanical lever comprising, on the one hand, a cooperation interface (1008a) with the drive cam (1006) and, on the other hand, a support interface (1008b) of a user.

5. Assembly for a locking/unlocking mechanism according to one of the preceding claims, characterized in that each of the bolts (1003a, 1003b) is associated with a respective drive cam (6) configured to be moved by a particular actuating part (1008).

6. Assembly for the locking/unlocking mechanism according to claim 5, characterized in that the slopes of the respective drive cams (1006) of each of the bolts (1003a, 1003b) are oriented in opposite directions.

7. Mechanism for locking/unlocking a movable part (1001) with respect to a fixed part (1002), characterized in that the mechanism comprises, on the one hand, a first assembly according to one of claims 1 to 6 and, on the other hand, a second assembly comprising a second support structure having at least one striker, the striker being configured to cooperate with the bolt (1003a, 1003b) of the first assembly.

8. System characterized in that the system comprises:
- a fixed part (1002) taken as a reference and with respect to which a movable part (1001) is movable,
- a locking/unlocking mechanism according to claim 7 configured such that, on the one hand, the first support structure (1009) is mounted on or integrated into the structure of a first part of the fixed part (1002) and the movable part (1001) and, on the other hand, the second support structure is mounted on or integrated into the structure of the second part of the fixed part (1002) and the movable part (1001).

9. System according to claim 8, characterized in that the fixed part (1002) is made by a covering part of a vehicle and the movable part (1001) is made by the closing panel of a storage space.

10. System according to one of claim 8 or 9, characterized in that at least one actuating part (1008) is positioned on the inner side of the movable part (1001) made by the closure panel of a storage space.

A still further embodiment relates to the field of locking and unlocking mechanisms and more particularly to the locking and unlocking mechanisms of a panel for closing a storage space.

In the passenger compartment of a vehicle, it is common to provide storage space integrated into a part of the dashboard and at least partially closed by a partition panel such as a hatch or cover. The partition panel shall then be so arranged that it can be held in the closed position so that the compartment formed by the storage space is independent of the volume of the passenger compartment.

According to a known design example, the locking mechanism of the partition panel in a storage space closing position, i.e. in a storage space opening closing position, involves a simple clipping mechanism comprising a part which, by elastic deformation, cooperates with a door latch of the housing. However, this type of construction, which is based on the deformation of a part, is likely to have an operating efficiency that deteriorates over time, or even to break.

In addition, the actuation of the partition panel locking mechanism requires the presence of an interface for operating the mechanism on the outside of the partition panel. The presence of such an operating interface then imposes additional constraints on the design and aesthetics of the partition panel.

The purpose of this embodiment is to overcome this disadvantage of the anterior art by proposing a mechanism that, on the one hand, optimizes the locking of the flap in the closed position of the storage space and, on the other hand, allows easy unlocking with improved operational durability, while allowing the constraints associated with the presence of an operating interface on the outside of the partitioning panel to be overcome.

The embodiment thus has as its object an assembly for a mechanism for locking/unlocking a part movable with respect to a fixed part, characterized in that the assembly comprises a support structure on which are mounted at least:
  a pair of translational bolts associated with a return to position device, at least one bolt carrying a support surface,
  a device for coordinating the translation of the bolts in opposite directions,
  an actuating part mounted in translation and comprising at least one surface configured to cooperate with the latch bearing surface.

The embodiment also concerns a mechanism for locking/unlocking a moving part with respect to a fixed part, characterized in that the mechanism comprises, on the one hand, a first assembly according to the embodiment and, on the other hand, a second assembly comprising a second support structure comprising at least one striker, the striker being configured to cooperate with the bolt of the first assembly.

The embodiment also concerns a system characterized in that the system includes:
  a fixed part taken as a reference and in relation to which a moving part is movable,
  a locking/unlocking mechanism according to the embodiment configured such that, on the one hand, the first support structure is mounted on or integrated into the structure of a first part among the fixed and movable part and, on the other hand, the second support structure is mounted on or integrated into the structure of the second part among the fixed and movable part.

Figure 24:
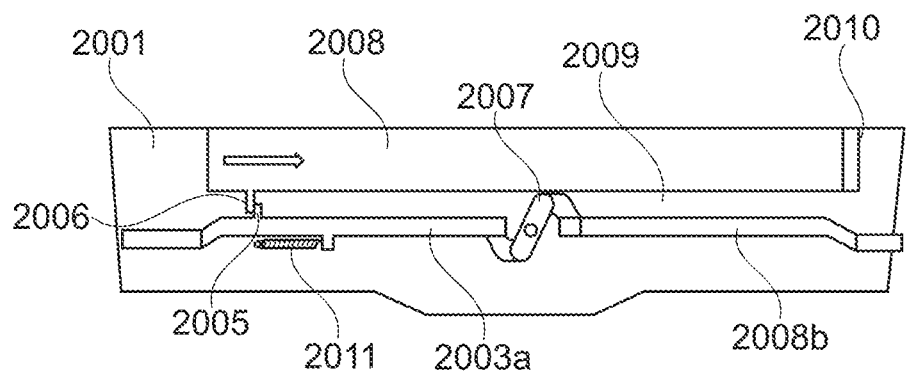
FIG. 24 (FIG. 1) is a schematic representation of a first example of the construction of an assembly for a locking/unlocking mechanism according to the invention.

The embodiment will be better understood, thanks to the following description, which refers to preferred modes of realization, given as non-exhaustive examples, and explained with reference to the attached schematic drawings, in which:

FIG. 24 (FIG. 1) is a schematic representation of a first example of the construction of an assembly for a locking/unlocking mechanism according to the embodiment.

Figure 25:
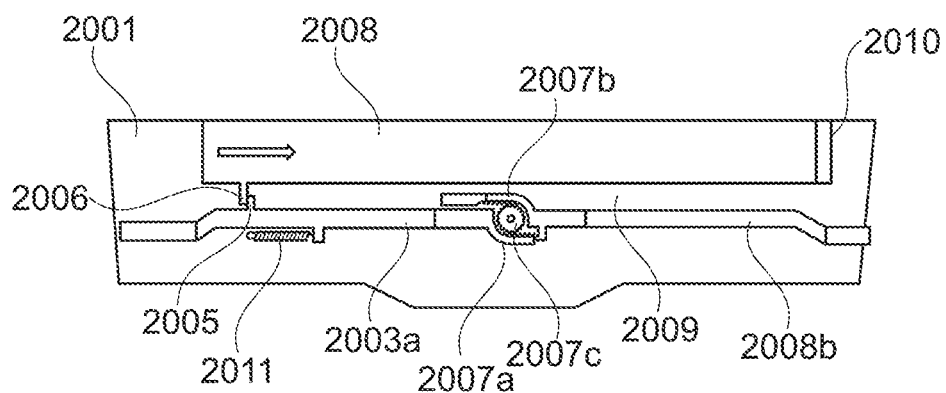
FIG. 25 (FIG. 2) is a schematic representation of a second example of the construction of an assembly for a locking/unlocking mechanism according to the invention.

FIG. 25 (FIG. 2) is a schematic representation of a second example of the construction of an assembly for a locking/unlocking mechanism according to the embodiment.

Figure 26:
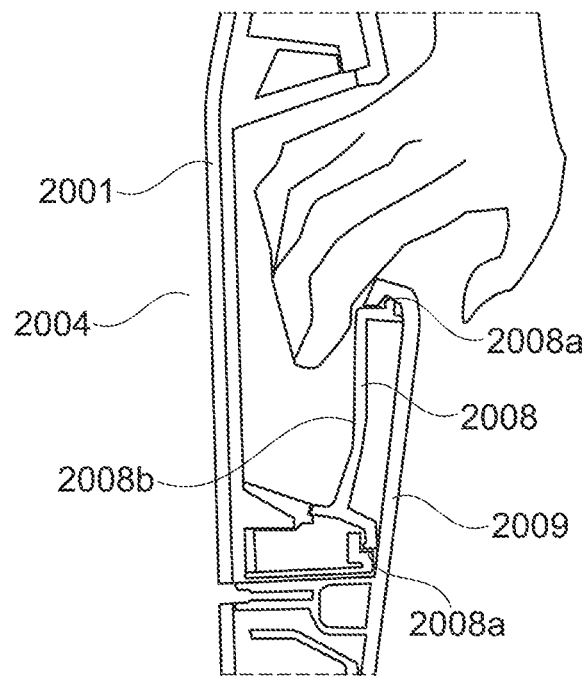
FIG. 26 (FIG. 3) is a schematic representation of an example of a user's interaction with the actuator part of an example of an assembly construction for a lock/unlock mechanism according to the invention.

FIG. 26 (FIG. 3) is a schematic representation of an example of a user's interaction with the actuator part of an example of an assembly construction for a lock/unlock mechanism according to the embodiment.

Figure 27:
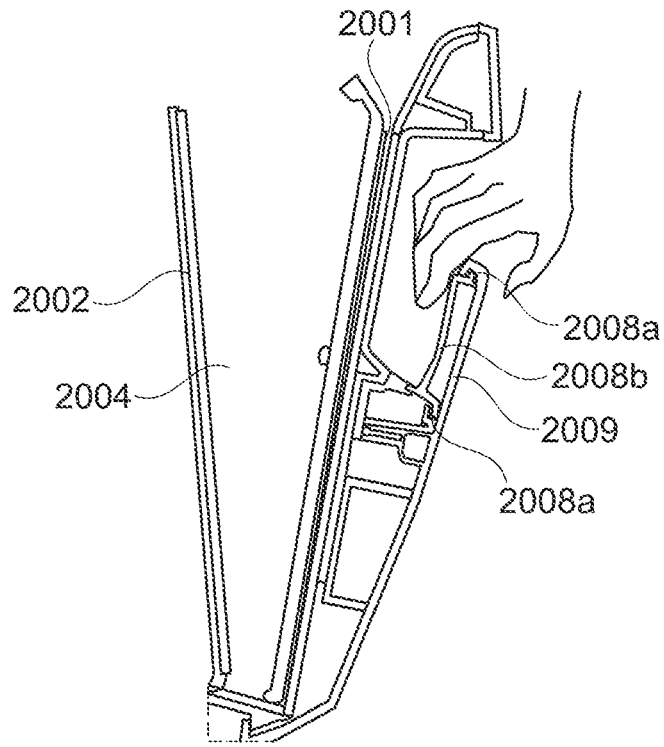
FIG. 27 (FIG. 4) is a more general schematic representation than FIG. 26 (FIG. 3) of an example of a user's interaction with the actuator part of an example of an assembly construction for a lock/unlock mechanism according to the invention.

FIG. 27 (FIG. 4) is a more general schematic representation than FIG. 3 of an example of a user's interaction with the actuator part of an example of an assembly construction for a lock/unlock mechanism according to the embodiment.

Figure 28:
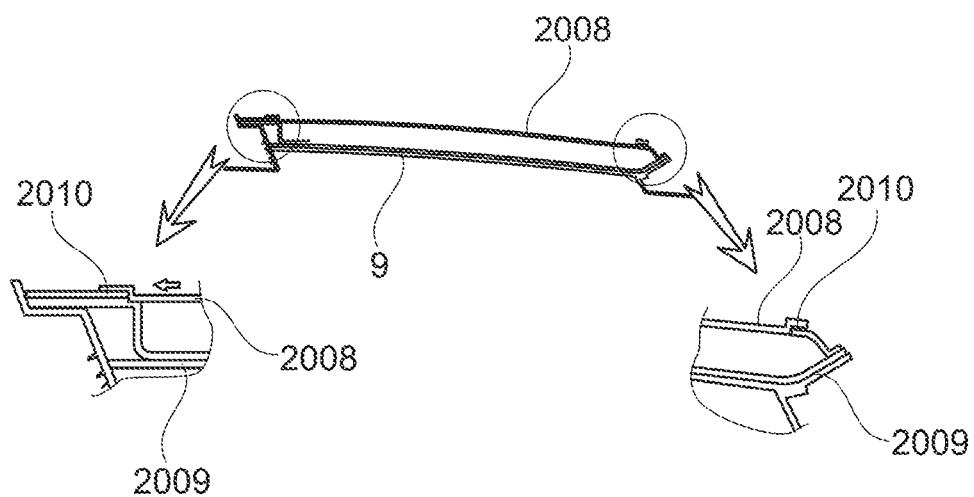
FIG. 28.

FIG. 28 (FIG. 5) is a schematic representation of the construction example of an assembly for a locking/unlocking mechanism according to FIG. 1 seen in horizontal section the embodiment the actuator part.

The embodiment concerns an assembly for a mechanism for locking/unlocking a movable part 2001 with respect to a fixed part 2002, characterized in that the assembly comprises a support structure 2009 on which are mounted at least:
  a pair of bolts 2003*a*, 2003*b* mounted in translation and associated with a return device 11 in position, at least one bolt 2003*a* carrying a support surface 2005,
  a coordination device 2007 for the translation of bolts 2003*a*, 2003*b* in opposite directions,
  an actuating part 2008 mounted in translation and comprising at least one surface 2006 configured to cooperate with the support surface 2005 of the bolt 2003*a*.

The embodiment also concerns a mechanism for locking/unlocking a movable part 2001 with respect to a fixed part 2002, characterized in that the mechanism comprises, on the one hand, a first assembly according to the embodiment and, on the other hand, a second assembly comprising a second support structure comprising at least one striker, the striker being configured to cooperate with the bolt 2003*a*, 2003*b* of the first assembly.

The assembly according to the embodiment, also mentioned as the first assembly of the embodiment mechanism, has the advantage of involving a closing by means of a locking point at each of the bolts 2003*a*, 2003*b* to interact with a respective strike carried by a second assembly. Closing is achieved by coordinating the locking of each of the bolts 2003*a*, 2003*b*, which move together thanks to a dedicated coordination device 2007. The translation of the bolts 2003*a*, 2003*b* in opposite directions allows the positioning of locking points at different edges of the junction between fixed part 2002 and moving part 2001. Also, from a cooperation between, on the one hand, the dedicated surface 2006 of the actuating part 2008 and, on the other hand, the support surface 2005 of the bolt 2003a, the locking/unlocking of the entire mechanism is carried out at two contact points respectively made by bolts 2003a, 2003b. In addition, according to a design example, the return device 11 in the position of bolt 2003a, 2003b is made by a spring which includes a first part associated or fixed to a bolt 2003a, 2003b and a second part associated or fixed to the support structure 9 on which the bolt 2003a, 2003b is mounted.

According to a design example, the coordination device 2007 for the translation of bolts 2003a, 2003b includes a gearwheel 2007c, an interface 2007a, 2007b carried by each of the bolts 2003a, 2003b to interact with the gearwheel 2007c. The interfaces 2007a, 2007b of the bolts include gear surfaces arranged to cooperate with the gearwheel 2007c of the coordination device 2007. The respective interfaces 2007a, 2007b of the bolts 2003a, 2003b are arranged opposite and separated by the gearwheel 2007c so that the rotation of the gearwheel 2007c allows to coordinate the movement of the bolts 2003a, 2003b in opposite directions. In addition, this construction allows, in addition to coordinating the respective translations of the bolts 2003a, 2003b, to drive the movement of the two bolts 2003a, 2003b by activating the translation of only one of them. Such a gear train realized by the cooperation of interfaces 2007a, 2007b carried by each of the bolts 2003a, 2003b with a toothed wheel 2007c realizes a device for the transmission of a translation force in opposite directions that presents a reliability over time, while ensuring a reduction in friction and an optimization of fluidity in the movement of movement of each of the parts.

According to an example of alternative construction, the coordination device 2007 for the translation of bolts 2003a, 2003b includes a lever arm mounted so as to pivot about an axis of rotation, each end of the lever arm cooperating with the end of a respective bolt 2003a, 2003b. According to a particularity of this example of construction, on the one hand, the axes of each of the bolts 2003a, 2003b are arranged so as to be in the same plane as the plane of rotation of the lever arm respectively and, on the other hand, the ends of the respective structures of each of the bolts 2003a, 2003b have interaction points with the lever arm offset laterally with respect to the respective main axis of each of the structures of the bolts 2003a, 2003b.

According to a classic design example, bolts 2003a, 2003b are arranged in parallel or even confused axes. However, according to an advantage of the coordination device 2007, which ensures a joint translation of the bolts 2003a, 2003b, this device allows the construction of an arrangement of the entire embodiment according to which the positioning of the bolts 2003a, 2003b between them is carried out, on the one hand, in a plane perpendicular to the axis of rotation of the gearwheel 2007c or the lever arm of the coordination device 2007 and, on the other hand, along non-parallel translation axes.

At least one of the bolts 2003a, 2003b, has a support surface 2005 configured to cooperate with a dedicated surface 2006 of the actuation part 2008, so that the translation of the actuation part 2008 causes the axial translation of at least one of the bolts 2003a, 2003b. Thus, the movement of actuating part 2008 operates a pressure of the dedicated surface 2006 against the support surface 2005 of a bolt 2003a to force the axial translation of the bolt 2003a. According to an example of the unlimited construction of the embodiment, this bearing surface 2005 is designed in the form of a finger or a shape projecting from the structure of bolt 2003a. Similarly, according to an example of an unlimited and complementary construction from the previous example, the dedicated surface 2006 of the actuating part 2008 is also supported by a finger or a shape projecting from the structure of the actuating part 2008; according to an example of a preferred construction of the embodiment, the actuating part 2008 is associated with a return device in position such as a spring mechanism.

According to a design variant, actuator part 2008 comprises a structure slidably mounted along a rectilinear portion of at least one 2008a guide rail. The orientation of the guide rail 2008a determines the axis of movement of the actuating part 2008, which allows a user to exert pressure on a dedicated user surface 2008b in order to translate the actuating part 2008 along its axis of movement.

According to a first specificity of this design variant, actuator part 2008 is mounted sliding along a substantially horizontal axis. Depending on a preferred construction of this specificity, actuator part 2008 is mounted sliding along an axis parallel to the bolt translation axis 2003a. Also, the dedicated surface 2006 of the actuating part 2008 and the support surface 2005 of the bolt 2003a with which it cooperates are arranged in a substantially vertical plane to optimize this cooperation.

According to a second specificity of this design variant, actuator part 2008 is mounted sliding along a substantially vertical axis and the bolt axes are also vertical. When the assembly includes several bolts, the respective translation axes are also arranged vertically. The dedicated surface 2006 of actuating part 2008 and the support surface 2005 of bolt 2003a are then arranged in a substantially horizontal plane.

According to a third specificity of this construction variant, which forms an alternative to the above-mentioned specificities, actuator part 2008 is mounted sliding along a substantially vertical axis. Depending on a preferred construction of this specificity, actuator part 2008 is mounted sliding along an axis perpendicular to the translation axis of bolt 2003a. Also, the axis of movement of the actuating part 2008 and the axis of movement of the bolt 2003a which carries the bearing surface 2005 being not parallel, the interaction between the bearing surface 2005 of the bolt 2003a and the dedicated surface 2006 of the actuating part 2008 with which the bearing surface of the bolt 2003a cooperates, is realized in the form of a ramp or a plane inclined with respect to the axis of movement of the actuating part 2008 and/or the bolt 2003a.

According to a fourth specificity similar to the third specificity, actuator part 2008 is mounted sliding along a substantially horizontal axis. Depending on a preferred construction of this specificity, actuator part 2008 is mounted sliding along an axis perpendicular to the vertical axis of translation of bolt 2003a. The cooperation between the dedicated surface 2006 of actuating part 2008 and the support surface 2005 of bolt 2003a involves a ramp or plane inclined with respect to the axis of movement of actuating part 2008 and/or bolt 2003a.

According to a particular example of the construction of the entire embodiment, actuator part 2008 comprises a substantially straight structure mounted on the support structure 2009 via a guide rail 2008a so as to provide the major part of its dedicated user surface 2008b accessible to a user to operate the mechanism of the embodiment. Also, the rectilinear structure of actuator part 2008 allows the creation of a long dedicated user surface 2008b carried by actuator part 2008 and at which a user is able to exert pressure to move actuator part 2008 in translation. This rectilinear structure of actuator part 2008, and in particular the dedicated user surface 2008b, is capable of being positioned along a long edge accessible to a user to operate the mechanism of the embodiment. Such an arrangement allows a user to exert pressure on the dedicated accessible user surface 2008*b* in order to translate the actuating part 2008 along its axis of movement and drive the associated bolt 2003*a* in movement through the cooperation of the concerned bearing surfaces 2005, 2006.

According to another particular and complementary example of construction, the assembly includes at least one stop 2010 positioned at the end of the length of the movement zone of the actuating part 2008 on the support structure 9 in order to limit the stroke of the actuating part 2008. preferably, the movement stroke of the actuating part 2008 is framed between two extreme positions which are each determined by the position supporting one end of the actuating part 2008 against a dedicated surface forming a stop 2010. According to a first construction variant, this dedicated surface which produces a stop 2010 is made by an independent element, for example in damping material such as an elastomer, mounted on the support structure 2009, and according to a second variant forming an alternative construction, the dedicated surface which produces a stop 2010 corresponds to a dedicated portion of the support structure 2009.

According to a particularity of the operation of the embodiment that can be combined with the various previously detailed characteristics, the movement of the actuating part 2008 by a user causes the translation of the associated bolt 2003*a* by means of the cooperation of the bearing surfaces 2005, 2006 respectively carried by the bolt 2003*a* and the actuating part 2008, in order to disengage the bolt 2003*a* from its strike. Jointly, through the dedicated coordination device 2007, the second latch 2003*b* is also driven in translation to disengage from its associated strike. Disengaging the bolts 2003*a*, 2003*b* from their respective strikes ensures that the mechanism is unlocked. Also, the pressure of a user on the dedicated user surface 2008*b* allows to generate a movement of the actuation part 2008 and an unlocking of the embodiment mechanism.

According to a construction feature of the bolts 2003*a*, 2003*b* of the mechanism which is not restrictive of the embodiment, the end of these bolts 2003*a*, 2003*b* intended to cooperate with a striker in the context of a locking system includes a ramp or bevel arrangement. This construction allows, when the mechanism is locked, the translation of the bolts 2003*a*, 2003*b* pushed under the action of the outer edge of the strike against the ramp of the bolt 2003*a*, 2003*b* until the bolt 2003*a*, 2003*b* is in position to be inserted into the inner housing of the strike. This particular construction makes it possible to facilitate the locking of moving part 2001 with fixed part 2002 by simply moving the parts closer together without the bolts 2003*a*, 2003*b* needing to be moved under the action of an actuating part 2008. in the absence of this construction feature, the bolts 2003*a*, 2003*b* must be moved by moving the actuating part 2008 in combination with the dedicated coordination device 2007.

The embodiment also concerns a system incorporating a locking/unlocking mechanism depending on the embodiment, characterized in that the system includes:

a fixed part 2002 taken as a reference and with respect to which a moving part 2001 is movable, a locking/unlocking mechanism according to the embodiment configured such that, on the one hand, the first support structure 2009 is mounted on or integrated into the structure of a first part among fixed part 2002 and movable part 2001 and, on the other hand, the second support structure is mounted on or integrated into the structure of the second part among fixed part 2002 and movable part 2001.

Thus, according to a particular example of the construction of this system illustrated in the figures, the support structures are made by a part of the parts, movable 2001 and fixed 2002, intended to be locked. Thus, the elements that make up the first assembly of the locking mechanism are mounted on the moving part 2001 that forms the support structure 9.

According to a particular example of construction of the embodiment system, fixed part 2002 is made by a vehicle cladding part which carries the opening of a storage space 2004 and movable part 2001 is made by the shutter panel of a storage space 2004; according to a specificity of this particular example, the first set of the locking mechanism of the embodiment is positioned on the inside face of the shutter panel of a storage space.

According to a first construction variant, the panel that produces moving part 2001 only partially closes the storage opening, and at least one actuating part 2008 is positioned on the inside face of moving part 2001 made by the shutter panel of a storage space 2004. under this first construction variant, the dedicated user surface 2008*b* is accessible for the hand of a user slid into the spacing of the storage opening that is not closed by the panel. Thus, the entire mechanism of the embodiment, including the dedicated 2008*b* user surface, remains invisible from outside the glove compartment, i.e. from the vehicle's passenger compartment.

According to a second construction variant, the panel that produces moving part 2001 comprises, on the one hand, a first wall that completely closes the opening of storage 2004 and, on the other hand, a second wall positioned in a plane substantially parallel to that of the first wall and on the side of the first wall opposite the storage space 2004 and oriented towards the user. The second wall of the panel has a dimensioning of its surface leaving an opening allowing access to the space between the two parallel walls of the panel for one hand of a user. According to this second construction variant, the dedicated user surface 2008*b* is mounted in the space between the two parallel walls of the panel.

According to an example of a specific complementary construction, the strikers that form the second assembly are made by housings whose openings are positioned at the junction between the movable panel and the dashboard that carries the storage space opening.

According to different design variants, the panel is mounted on the dashboard in the form of a swivel joint, as for example in the case of a glove box type storage, or alternatively in the form of a sliding joint, as for example in the case of a drawer type storage.

Of course, the embodiment is not limited to the methods of making it described and represented in the attached drawings. Changes remain possible, in particular with regard to the constitution of the various elements or by substitution of technical equivalents, without leaving the field of protection of the embodiment.

1. Assembly for a mechanism for locking/unlocking a movable part (2001) with respect to a fixed part (2002), characterized in that the assembly comprises a support structure (2009) on which are mounted at least:

a pair of bolts (2003*a*, 2003*b*) mounted in translation and associated with a return device (2011) in position, at least one bolt (2003*a*) carrying a support surface (2005), a coordination device (2007) for coordinating the translation of the bolts (2003*a*, 2003*b*) in opposite directions, an actuating part (2008) mounted in translation and comprising at least one surface (2006) configured to cooperate with the bearing surface (2005) of the bolt (2003*a*).

2. Assembly for the locking/unlocking mechanism according to claim 1, characterized in that the actuator (2008) comprises a structure slidably mounted along a rectilinear portion of at least one guide rail (2008*a*).

3. Assembly for a locking/unlocking mechanism according to one of claims 1 to 2, characterized in that the actuating part (2008) is slidably mounted along a substantially horizontal axis.

4. Assembly for a locking/unlocking mechanism according to one of claims 1 to 2, characterized in that the actuating part (2008) is slidably mounted along a substantially vertical axis.

5. Assembly for a locking/unlocking mechanism according to one of the previous claims, characterized in that the axis of movement of the actuating part (2008) and the axis of movement of the bolt (2003*a*) carrying the bearing surface (2005) are not parallel, the interaction between the bearing surface (2005) of the bolt (2003*a*) and the dedicated surface (2006) of the actuating part (2008) with which the bearing surface of the bolt (2003*a*) cooperates, is carried out in the form of a ramp or a plane inclined with respect to the axis of movement of the actuating part (2008) and/or the bolt (2003*a*).

6. Assembly for a locking/unlocking mechanism according to one of the preceding claims, characterized in that the assembly comprises at least one stop (2010) positioned at the end of the length of the movement zone of the actuating part (2008) on the support structure (2009) so as to limit the stroke of the actuating part (2008).

7. Mechanism for locking/unlocking a movable part (2001) with respect to a fixed part (2002), characterized in that the mechanism comprises, on the one hand, a first assembly according to the embodiment and, on the other hand, a second assembly comprising a second support structure comprising at least one striker, the striker being configured to cooperate with the bolt (2003*a*, 2003*b*) of the first assembly.

8. System characterized in that the system comprises:
a fixed part (2002) taken as a reference and with respect to which a movable part (2001) is movable,
a locking/unlocking mechanism according to claim 7 configured such that, on the one hand, the first support structure (2009) is mounted on or integrated into the structure of a first part of the fixed part (2002) and the movable part (2001) and, on the other hand, the second support structure is mounted on or integrated into the structure of the second part of the fixed part (2002) and the movable part (2001).

9. System according to claim 8, characterized in that the fixed part (2002) is made by a vehicle cladding part which carries the opening of a storage space (2004) and the movable part (2001) is made by the storage closure panel (2004).

10. System according to one of claim 8 or 9, characterized in that at least one actuating part 8 is positioned on the inner side of the movable part (2001) made by the closure panel of a storage space (2004).

While one or more exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

The features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

Glossary

NiTiNol

Nickel titanium, also known as Nitinol (part of shape memory alloy), is a metal alloy of nickel and titanium, where the two elements are present in roughly equal atomic percentages e.g. Nitinol 55, Nitinol 60.

Nitinol alloys exhibit two closely related and unique properties: shape memory effect (SME) and superelasticity (SE; also called pseudoelasticity, PE). Shape memory is the ability of nitinol to undergo deformation at one temperature, then recover its original, undeformed shape upon heating above its "transformation temperature". Superelasticity occurs at a narrow temperature range just above its transformation temperature; in this case, no heating is necessary to cause the undeformed shape to recover, and the material exhibits enormous elasticity, some 10-30 times that of ordinary metal.

https://en.wikipedia.org/wiki/Nickel titanium

The invention claimed is:

1. A latch assembly for an access door of a storage compartment in a vehicle, the latch assembly comprising:
a locking bar coupled to the access door, the locking bar configured to be movable into (i) an engaged configuration which enables the access door to be placed and held into a closed position and (ii) a disengaged configuration which permits the access door to be placed into an opened position; and
an automatic locking mechanism including a shape memory alloy (SMA) actuator coupled to the access door, the SMA actuator configured to be coupled to the access door, the automatic locking mechanism further including a locking feature having a central axis parallel to a central axis of the locking bar, the locking feature including a protruding bolt, the protruding bolt operably coupled to a portion of the locking bar, the SMA actuator having a receiving opening to receive the protruding bolt and having a locking slider movable in a direction perpendicular to the central axis of the locking feature, the locking slider configured to engage and disengage the protruding bolt as the locking bar respectively moves between the engaged and disengaged configurations, wherein when the access door is placed into the closed position and the protruding bolt is engaged with the SMA actuator and the SMA actuator is electrically energized to move into a locked position to prohibit the locking feature from moving, the locking bar is prohibited from moving and locks the access door in the closed position.

2. A latch assembly for an access door of a storage compartment in a vehicle, the latch assembly comprising:
a locking bar comprising a slide cam, the locking bar configured to be movable into (i) an engaged configuration with the storage compartment, which enables the access door to be placed and held into a closed position and (ii) a disengaged configuration with the storage compartment, which permits the access door to be placed into an opened position; and
a shape memory alloy (SMA) actuator comprising a support structure attached at the access door, the locking bar to be movably guided in the support structure, the locking bar being connected to an SMA wire held in the support structure, the SMA wire being electrically connected to an electrical power supply, the slide cam of the locking bar interacting with an electrical switch fixed at the support structure switching off an electric current provided to the SMA actuator when the slide cam engages with the electrical switch, wherein when electrically energized, the SMA actuator is configured to move the locking bar into the disengaged configuration with the storage compartment and permit the access door of the storage compartment to open.

3. The latch assembly of claim 2, wherein the SMA wire comprises two ends, each of the two ends of the SMA wire being connected to a connector attached to the support structure and wherein the locking bar comprises a deflection point at which the SMA wire is deflected.

4. The latch assembly of claim 2, wherein the support structure houses a second SMA wire connected to the support structure to operate a second locking bar arranged at an opposite end of the support structure.

5. The latch assembly of claim 2, wherein the movable locking bar is engaged with the support structure in a first end position against a spring force of a preloaded biasing element, the first end position enabling an engaged configuration with the storage compartment, which enables the access door to be placed and held into a closed position.

6. The latch assembly of claim 5, wherein the movable locking bar is engaged with the support structure in a second end position against a spring force of a preloaded biasing element and against the force of the SMA wire heated by an electric current, the second end position enabling a disengaged configuration with the storage compartment, which enables the access door to be placed into an opened position.

7. The latch assembly of claim 6, wherein, the SMA wire is preloaded with a force lower than the force of the preloaded biasing element.

8. The latch assembly of claim 2, wherein the thickness of the SMA wire is between 0.05 mm and 0.5 mm.

9. The latch assembly of claim 2, wherein the cooling time of the SMA wire heated to a temperature above a transformation temperature of the SMA wire to fall below the transformation temperature is between 0, 01 and 2 s.

10. The latch assembly of claim 2, wherein the cooling rate of the SMA wire is at least 30 K/s after having been heated up to 110° C.

11. The latch assembly of claim 2, wherein at least one of the following has a high thermal conductivity: the support structure, the locking bar, and the connector of the SMA wire.

12. The latch assembly of claim 2, wherein the SMA wire is made out of NiTi.

13. The latch assembly of claim 2, wherein the locking bar of the SMA actuator is engaged with the storage compartment by intermediary of a locking bar attached to the access door.

* * * * *